US012001894B2

(12) United States Patent
MacGaffey

(10) Patent No.: US 12,001,894 B2
(45) Date of Patent: Jun. 4, 2024

(54) COMPONENT-AWARE REST API ROUTING GATEWAY

(71) Applicant: MetaFluent, LLC, Warrenville, IL (US)

(72) Inventor: Andrew MacGaffey, Carol Stream, IL (US)

(73) Assignee: MetaFluent, LLC, Warrenville, IL (US)

( * ) Notice: Subject to any disclaimer, the term of this patent is extended or adjusted under 35 U.S.C. 154(b) by 0 days.

(21) Appl. No.: 17/725,131

(22) Filed: Apr. 20, 2022

(65) Prior Publication Data

US 2023/0103761 A1  Apr. 6, 2023

Related U.S. Application Data

(60) Provisional application No. 63/176,968, filed on Apr. 20, 2021.

(51) Int. Cl.
G06F 3/00 (2006.01)
G06F 9/54 (2006.01)
G06F 16/955 (2019.01)

(52) U.S. Cl.
CPC .............. *G06F 9/54* (2013.01); *G06F 16/955* (2019.01)

(58) Field of Classification Search
CPC ........................................................ G06F 9/54
USPC ....................................................... 719/328
See application file for complete search history.

(56) References Cited

U.S. PATENT DOCUMENTS

| 10,769,000 B1* | 9/2020 | Plunk .................. G06F 9/44536 |
| 10,878,270 B1* | 12/2020 | Cao ........................ G06V 10/82 |
| 10,911,540 B1* | 2/2021 | Gunasekaran .......... G06F 9/541 |
| 10,917,401 B1* | 2/2021 | Mantin ............... H04L 63/1441 |
| 11,138,249 B1* | 10/2021 | Tosik .................. G06F 16/3347 |
| 11,329,936 B1* | 5/2022 | Cao ....................... H04L 51/234 |
| 2007/0077922 A1* | 4/2007 | Kim ........................ H04H 20/57 |
| | | 455/414.2 |
| 2010/0262367 A1* | 10/2010 | Riggins ................ G08B 25/016 |
| | | 455/500 |
| 2015/0089605 A1* | 3/2015 | Trifa ....................... G06F 21/34 |
| | | 726/5 |
| 2017/0005515 A1* | 1/2017 | Sanders .................. H02J 3/388 |
| 2017/0228711 A1* | 8/2017 | Chawla ............... G06Q 20/384 |

(Continued)

FOREIGN PATENT DOCUMENTS

| CN | 101547206 A | * | 9/2009 | ........... H04L 12/281 |
| DE | 60121605 T2 | * | 12/2006 | ............. G06F 9/465 |

OTHER PUBLICATIONS

Gaurav Sharma, A Framework for Automatic Categorization of Social Data Into Medical Domains. (Year: 2020).*

(Continued)

*Primary Examiner* — Lechi Truong
(74) *Attorney, Agent, or Firm* — Potomac Law Group, PLLC

(57) ABSTRACT

Embodiments perform gateway routing by receiving an application programming interface ("API") request for an API from a client for a resource from a first endpoint, wherein a plurality of endpoints each include an instance of the API and each endpoint is associated with a unique identifier. The first API request includes a path that specifies a single unique identifier. Embodiments route the first API request to the first endpoint associated with the single unique identifier.

20 Claims, 11 Drawing Sheets

(56) References Cited

U.S. PATENT DOCUMENTS

| | | | |
|---|---|---|---|
| 2018/0276041 A1* | 9/2018 | Bansal | G06F 11/30 |
| 2018/0365190 A1* | 12/2018 | Poitrey | G06F 9/3885 |
| 2019/0036878 A1* | 1/2019 | Morrison | G06F 16/9566 |
| 2019/0149365 A1* | 5/2019 | Chatterjee | H04L 5/0094 |
| | | | 370/329 |
| 2020/0244767 A1* | 7/2020 | Whang | H04L 67/133 |
| 2020/0344124 A1* | 10/2020 | Christober | H04L 41/0806 |

OTHER PUBLICATIONS

Mihal Brumbulli, Automatic Verification of BPMN Models. (Year: 2020).*

Max Mathijssen, Identification of Practices and Capabilities in API Management: A Systematic Literature Review. (Year: 2020).*

* cited by examiner

COMPONENT-AWARE REST API ROUTING GATEWAY

CROSS REFERENCE TO RELATED APPLICATIONS

This application claims priority to U.S. Prov. Pat. Appln. Ser. No. 63/176,968, filed Apr. 20, 2021, the disclosure of which is hereby incorporated by reference.

FIELD

One embodiment is directed generally to a computer system, and in particular to a computer system/architecture for routing network requests.

BACKGROUND INFORMATION

Representational state transfer ("REST") is a software architectural style that was created to guide the design and development of the architecture for the World Wide Web. REST defines a set of constraints for how the architecture of an Internet-scale distributed hypermedia system, such as the Web, should behave. The REST architectural style emphasizes the scalability of interactions between software components, uniform interfaces, independent deployment of software components, and the creation of a layered architecture to facilitate caching components to reduce user-perceived latency, enforce security, and encapsulate legacy systems.

REST has been employed throughout the software industry and is a widely accepted set of guidelines for creating stateless, reliable web APIs. A web application programming interface ("API") that obeys the REST constraints is informally described as RESTful or a REST API. RESTful web APIs are typically loosely based on HTTP methods to access resources via URL-encoded parameters and the use of JavaScript Object Notation ("JSON") or Extensible Markup Language ("XML") to transmit data.

"Web resources" in general are considered documents or files identified by their URLs, but may include every thing, entity, or action that can be identified, named, addressed, handled, or performed in any way on the Web. In a RESTful Web service, requests made to a resource's URI elicit a response with a payload formatted in HTML, XML, JSON, or some other format. For example, the response can confirm that the resource state has been changed. The response can also include hypertext links to related resources. The most common protocol for these requests and responses is HTTP. It provides operations (HTTP methods) such as GET, POST, PUT, and DELETE. By using a stateless protocol and standard operations, RESTful systems aim for fast performance, reliability, and the ability to grow by reusing software components that can be managed and updated without affecting the system as a whole, even while it is running.

Related to APIs, such as the REST API, is the task of management, which includes the process of creating and publishing the APIs, enforcing their usage policies, controlling access, nurturing the subscriber community, collecting and analyzing usage statistics, and reporting on performance. API management components provide mechanisms and tools to support developer and subscriber communities. One such component is an API gateway, which in general is a server that acts as an API front-end, receives API requests, enforces throttling and security policies, passes requests to the back-end service and then passes the response back to the requester. An API gateway often includes a transformation engine to orchestrate and modify the requests and responses on the fly. An API gateway can also provide functions such as collecting analytics data and providing caching.

SUMMARY

Embodiments perform gateway routing by receiving an application programming interface ("API") request for an API from a client for a resource from a first endpoint, wherein a plurality of endpoints each include an instance of the API and each endpoint is associated with a unique identifier. The first API request includes a path that specifies a single unique identifier. Embodiments route the first API request to the first endpoint associated with the single unique identifier.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Embodiments are directed to a component-aware routing representational state transfer application programming interface ("REST API") gateway ("API gateway") supporting Hypertext Transfer Protocol ("HTTP") requests and providing an expression-based routing and aggregation capability such that a standard HTTP client can interact with one or more instances of an identical REST API using a single HTTP request directed to the API gateway. Embodiments further provides semantically consistent API documentation (e.g., using the OpenAPI standard) for both single (point-to-point) or multi-node access via the single API Gateway, thus enabling automated tooling.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Physical View

Figure 1:
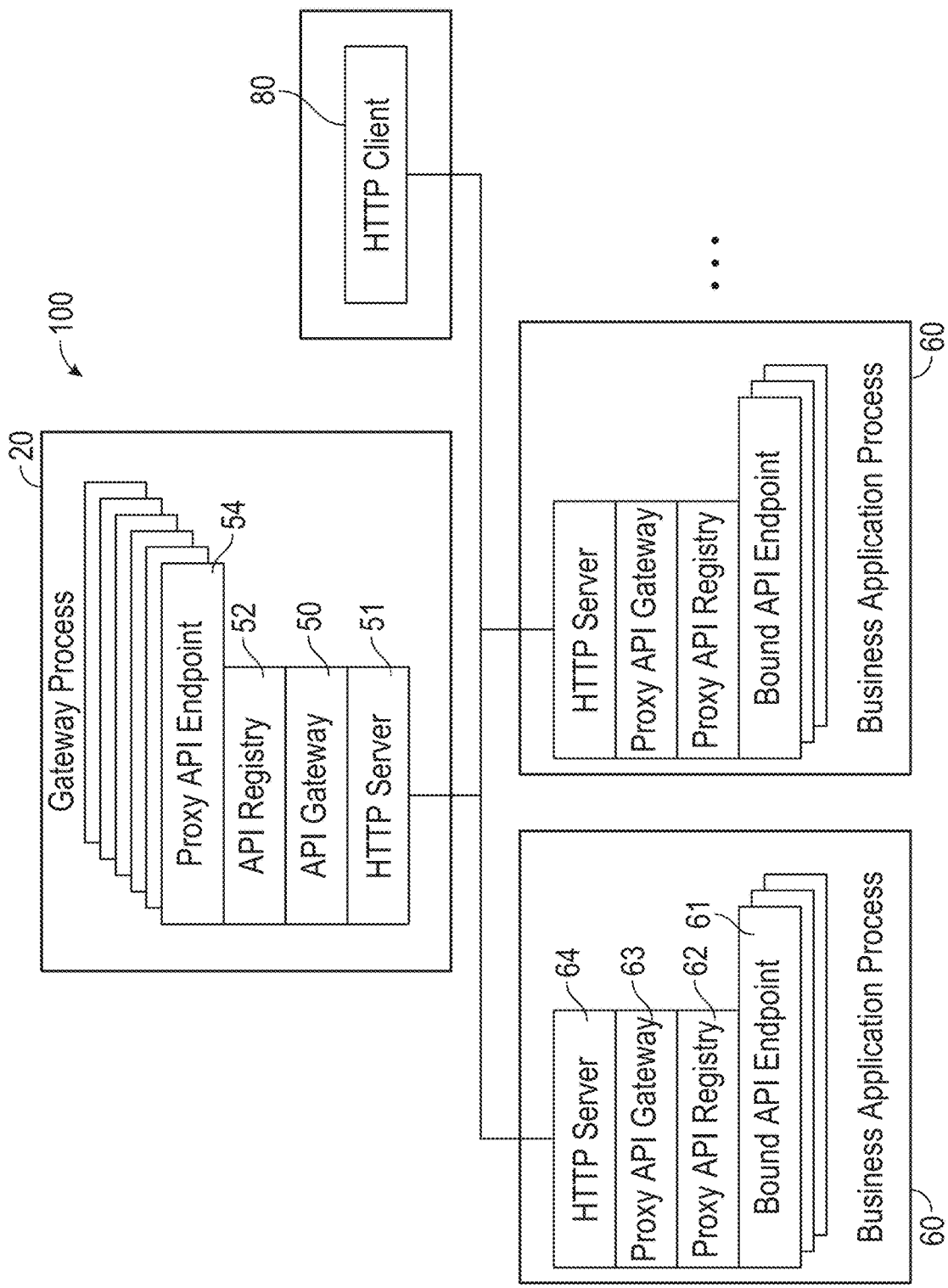
FIG. 1 is a block diagram of an overall system that incorporates the API Gateway in accordance to embodiments of the invention.

FIG. 1 is a block diagram of an overall system 100 that incorporates the API Gateway 50 in accordance to embodiments of the invention. FIG. 1 is a system deployment diagram. System 100 includes the centralized Gateway Process 20. Gateway Process 20 includes an HTTP Server 51, an API Gateway 50, an API Registry 52 and some number of Proxy API Endpoints 54, each corresponding to a Bound API Endpoint registered somewhere in system 100. System 100 further includes a plurality of business application processes 60 that each include an HTTP Server 64, a Proxy API Gateway 63, a Proxy API Registry 62, and some number of Bound API Endpoints 61. System 100 further includes an HTTP Client 80 through which REST API requests are generated and the response is received. All elements of FIG. 1 are communicatively coupled via one or more networks such as the Internet and/or a cloud network.

API Gateway 50 is an HTTP handler service integrated with HTTP Server 54 that enables access by various types of REST Client to some set of API Endpoints comprising multiple API types and versions. API Registry 52 is a catalog representing some domain of available API Endpoints organized by API type and version. HTTP Server 54 is any standard or purpose-built HTTP server-side component that handles HTTP protocol traffic and supports modular integration with HTTP "handlers" for different resource paths.

Each of business application processes 60 function as an API endpoint, which is an application or application software component (i.e., a modular unit of software that can be used to assemble applications, hereafter "component") that exposes a particular type and version of a REST API. The applications may be a business application, which is an executable process comprising one or more application components and corresponding API Endpoints.

HTTP Client 80 is a REST Client, which is any standard or purpose-built HTTP client-side component or application that accesses REST APIs via an HTTP server using REST protocols.

In embodiments, novel functionality of system 100, as disclosed in detail below, includes but not limited to functionality of API Gateway 50 (e.g., routing to multiple endpoints and marshalling), ProxyAPIEndpoint 54 (e.g., routing to remote BoundAPIEndpoint 51), ProxyAPIGateway 63 (e.g., local routing/marshalling to multiple endpoints) and BoundAPIEndpoint 61 (e.g., responding with the responsive API Document).

Figure 2:
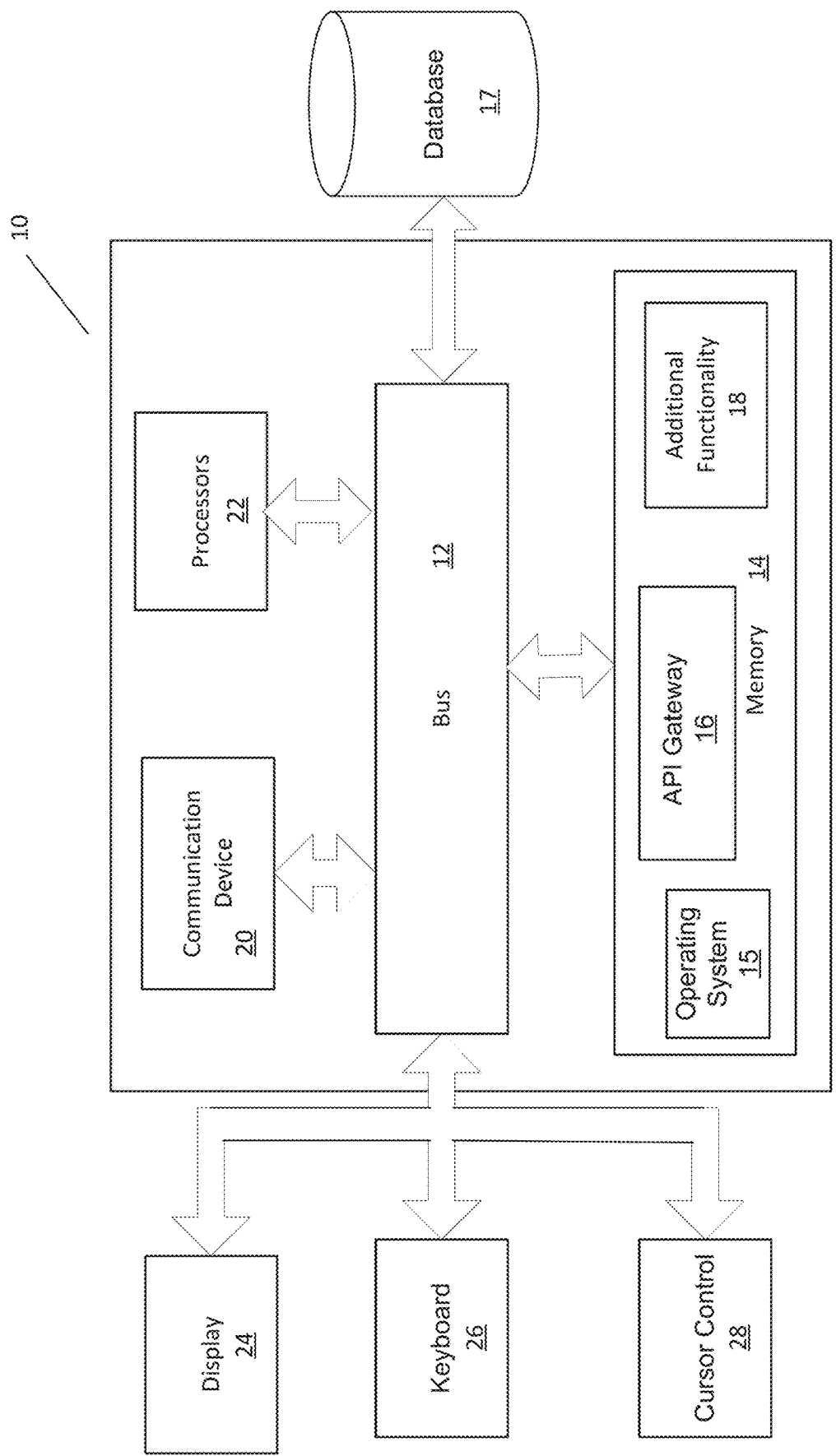
FIG. 2 is a block diagram of a computer server/system that can implement the Gateway Process of FIG. 1 in accordance with embodiments of the present invention.

FIG. 2 is a block diagram of a computer server/system 10 that can implement Gateway Process 20 of FIG. 1, including API Gateway 50 or controller 50, in accordance with embodiments of the present invention. System 10 can further implement any of the other elements of FIG. 1, including any of the API endpoints. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an API Gateway module 16 that implements the functionality of API Gateway 50 and all other novel functionality disclosed herein. System 10 can be part of a larger system. Therefore, system 10 can include one or more additional functional modules 18 to include additional functionality, such as a the functionality of Gateway Process 10. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In a cloud-deployed solution comprising large numbers of related applications that require monitoring and control (e.g., an auto-scaled collection of microservices), the design of monitoring applications is in itself a complex problem. Known solutions often expose REST APIs for the purpose of building monitoring and control solutions. While a REST API is standards-based, well-understood and supported by many tools and applications, this does not necessarily translate to ease of use when the underlying system is very complex.

For example, a complex system can easily have tens of different REST APIs. There can also be multiple endpoints (servers/applications/components) supporting any given API. Further, the composition of such a system may change dynamically as the system scales up and down to meet business needs. Any conventional monitoring or controlling application therefore is exposed to all this complexity, including the dynamic aspects of system composition.

As disclosed, embodiments, in general, provide an expression-based routing and aggregation capability for REST API requests and responses via an API Gateway 50 to overcome this complexity. Known solutions exists for aggregating REST responses, sometimes referred to as "API Composition" or "Gateway Aggregation". However, existing aggregation solutions aggregate responses from disparate APIs, each representing a distinct type of microservice or business application. In these aggregation architectures the microservices are each accessible via a distinct host and port (i.e., on separate HTTP servers).

In contrast, embodiments of the invention provide access to multiple components having the same API and supporting the situation where multiple instances of an API are located in a single business process behind a single HTTP server. Further, embodiments allow client applications to choose to access an individual component or some, or all, similar components in a system. When accessing a subset, the routing mechanism in accordance to embodiments provides server-side filtering of responses. Server-side filtering can significantly reduce both client-side CPU load and overall network utilization. In embodiments, this routing and filtering uses a novel routing expression in Uniform Resource Locator ("URL") resource paths that accommodates component identifiers, wild-card expressions and predicates.

Further, service registry solutions, such as an API Registry, used for both client-side and server-side service discovery, as well as known self-registry solutions, are known. However, these known API composition techniques introduce a new API that must be administrative configured or otherwise defined by the gateway solution. The process of designing a new API is an extra step in a design and deployment sequence.

In contrast, embodiments of the invention support the automated mutation of an API specification so as to provide the correct semantics for aggregation of responses from similar APIs into arrays of responses. This capability is important for automated tooling and mechanisms such as tooltips in user interfaces.

Further, embodiments, when providing access to very fine-grained grained components, provide the ability for API Gateway 50 to selectively request the API Document from the component when registered. In an architecture with fine-grained API components, there may be hundreds of similar components that come and go dynamically. The ability to selectively request the API Document (i.e., from only the first observed component of a given type and version) significantly reduces the overhead (in terms of CPU and network bandwidth) associated with the registration and maintenance of endpoints within a service registry.

Logical View

Embodiments implement REST with HTTP, using PUT and POST interchangeably. An HTTP URL in embodiments conforms to the syntax of a generic URI as follows:
 URI=scheme ":" ["//" authority] path ["?" query] ["#" fragment]
For the path portion of URLs, embodiments use an arbitrary prefix of "api". Embodiments also assume that in a distributed system there may be multiple types of APIs and multiple versions of a given API type and therefore incorporate a version into the path. Embodiments further assume that a given process, supported by an embedded HTTP Server, may contain multiple instances of a particular component. Therefore, in order to differentiate one component from another, components are assigned a Universally Unique ID ("UUID") which is incorporated into the path conventions. The UUID is novel functionality that distinguishes multiple similar components from one another behind the same REST server and via API Gateway 50 so they be routed to individually as well as collectively. Further, the UUID portion of the path is generalized to be a routing expression that can match specific endpoints (by UUID), all endpoints (using a "wild-card" expression) or endpoints that satisfy one or more predicate expressions. The wild-card expression is the character '*' and is an expression that indicates a request should be routed by API Gateway 50 to all endpoints having a particular API type and API version. The path may reference the entirety of some resource or a subset of the resource. A subset is defined by using a sub-resource path. The expression syntax in accordance to embodiments is further disclosed in the Appendix I, attached herewith.

For example, in the component-oriented application architecture in accordance to embodiments, each component within the architecture may contain a log event handler specific to the component. There could therefore be multiple such handlers within a single application process. Further, the log handler could expose a REST API allowing an administrator to observe and control the level of logging. The API for this log handler might have the type "log", the version "v1". Assuming a particular log handler having the UUID value "8810533c-b52a-11ec-b909-0242ac120002", this log handler would have the root path as follows:
 "api/log/v1/8810533c-b52a-11ec-b909-0242ac120002/"
The path referencing all log handlers in the system would be:
 "/api/log/v1/*/"
And, assuming this logging mechanism has a logging level filter exposed as a resource called "level", the path referencing the value of level from all handlers would be:
 "/api/log/v1/*/level"
While the path referencing only those components with level of "FINE" would be:
 "/api/log/v1/level=FINE/"
Embodiments document a REST API using the Open API standard. The resulting documentation can be used by humans or automated tooling to understand how the API is to be used and the semantics of various resources exposed by the API. An example of an API documented according to the Open API specification is disclosed in Appendix II, attached herewith.

In embodiments, all endpoints can produce a copy of their API document on demand via a top-level resource called "apidoc". For the above disclosed log handler, the API document resource path would be:
 "/api/log/v1/8810533c-b52a-11ec-b909-0242ac120002/apidoc"

As disclosed above, embodiments include conventions for paths with routing expressions (using either a wild-card or a predicate expression) and differentiates those paths from paths with the UUID pattern that specifically identifies a particular endpoint. A consequence of routing a single request to multiple endpoints is the receipt of multiple responses. This breaks the contract defined by the endpoint API. Note that the endpoint isn't aware that it's responding to a request sent to multiple nodes.

Embodiments solve this problem by adapting the API definition for paths with a routing expression such that content return values for GET operations are defined as arrays of some schema entity rather than the schema entity itself. The implication of this mutation is that the API definition for the UUID path is the API definition supplied by the endpoint, while the API definition for the expression path is different and accommodates multi-value responses.

The "arrayification" of a content specification is such that

```
"content": {
    "application/json": {
        "schema": {
            "$ref" "#components/schemas/StdString"
        }
    }
}
``` becomes

```
"content": {
        "application/json": {
            "schema": {
                "type": "array",
                "items": {
                    "$ref: "#/components/schemas/StdString"
                }
            }
        }
    }
```

For example, the API document fragment for the log level example described above might look as follows:

```
"/level": {
    "description": "Log level filter",
    "get": {
        "operationId": "getLogLevel",
        "description": "Get the value of level",
        "responses": {
            "200": {
                "description": "A String",
                "content": {
                    "application/json": {
                        "schema": {
                            "$ref" "#/components/schemas/StdString"
                        }
                    }
                }
            },
            "default": {
                "description": "Unexpected error"
            }
        }
    }
},...
```

Where as the "arrayified" version of the same API fragment would be:

```
"/level": {
    "description": "Log level filter",
    "get": {
        "operationId": "getLogLevel",
        "description": "Get the value of level",
        "responses": {
            "200": {
                "description": "A String",
                "content": {
                    "application/json": {
                        "schema": {
                            "type": "array",
                            "items": {
                                "$ref: "#/components/schemas/StdString"
                            }
                        }
                    }
                }
            },
            "default": {
                "description": "Unexpected error"
            }
        }
    }
},...
```

Appendix II and Appendix III, attached herewith, disclose a more component example of, respectively, a standard vs "arrayified" API definition.

A enterprise architecture may have one or more endpoints of some type that, by design, must be a singleton (i.e., a single resource instance, rather than a resource collection). In other words, the system architecture may define that only one such endpoint may exist within an architecture. In embodiments, support for expression paths is not required. Embodiments support singletons by allowing endpoints to declare themselves as a singleton.

Figure 3:
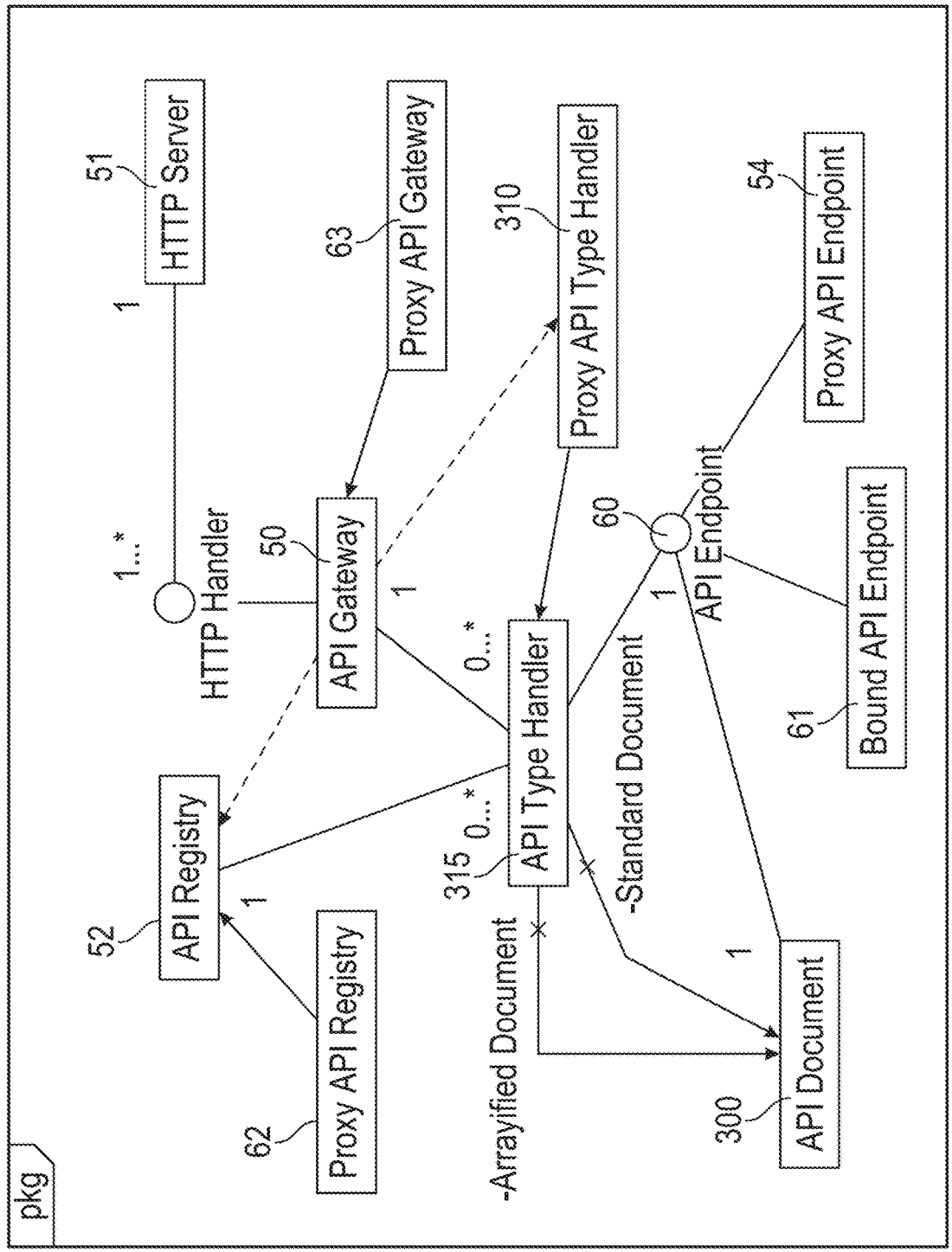
FIG. 3 is a class diagram of key design elements in the logical view of embodiments of the invention.

FIG. 3 is a class diagram of key design elements in the logical view of embodiments of the invention.

APIEndpoint 60 is an abstraction for a component within an application or process that exposes a REST API. An API is characterized by a type name, a version, and other metadata, such as a description. An API exposes various resources and sub-resources each identified by a URI and supporting some set of REST operations. An APIEndpoint is responsible for processing REST operations and generating appropriate responses as defined by its API.

An API type name identifier distinguishes one API from another but over time different versions of the API may change the API, possibly in a manner that is incompatible with previous versions. Therefore, within a process or a system comprised of many processes and components, multiple versions of an API may coexist.

By convention, any APIEndpoint in embodiments support access to its own API document via a root level resource path called "apidoc".

By design, API Gateway 50 will timeout an APIEndpoint after some agreed interval. Therefore an APIEndpoint must periodically confirm its existence with APIGateway 50. The refresh interval is specified by adding an extension property "x-refresh-interval-milliseconds" to the info section of the Open API specification.

If an APIEndpoint is designed as a singleton, it indicates this by adding an extension property "x-singleton" to the info section.

Lastly, an APIEndpoint indicates its root resource path by adding an extension property "x-type" to the info section.

For example, the APIRegistry is itself a singleton and has an "info" declaration as follows:

```
"info": {
    "title": "API Registry",
    "description": "A registry of API endpoints",
    "version": "v1",
    "x-type": "registry",
    "x-refresh-interval-milliseconds": 1000,
    "x-singleton": true
}
```

BoundAPIEndpoint 61 is an APIEndpoint implementation bound to a particular component within some process.

A BoundAPIEndpoint responds to REST requests by interrogating and/or manipulating the state of the target component.

ProxyAPIEndpoint 34 is an APIEndpoint that represents an APIEndpoint in a remote process. When a REST request is made to a ProxyAPIEndpoint, the proxy forwards the request to its corresponding remote endpoint and waits for the response.

An APIDocument 300 is an object-oriented representation of the Open API description and can be serialized as JSON (and deserialized from JSON) for transport to a REST Client. An APIDocument instance is able to produce an "arrayified" clone of itself.

An APITypeHandler 315 manages a collection of APIEndpoint instances having a particular combination of API type and version. An APITypeHandler intercepts and processes all REST requests for its constituent endpoints, and is responsible for routing REST requests to one or more of its constituent APIEndpoints depending on the resource path used in the request.

An APITypeHandler obtains the APIDocument for the type and version from the first constituent (recall that endpoints can all supply their own APIDocument on request). This is true whether the endpoint is bound or proxied. Using the APIDocument instance, the APITypeHandler requests and caches the "arrayified" version of the APIDocument.

Requests for the APIDocument associated with the API represented by the APITypeHandler are intercepted by the APITypeHandler. Requests sent to UUID paths result in the original APIDocument while requests sent to the expression path result in the "arrayified" version of the APIDocument.

When routing a REST request targeting the expression path to multiple endpoints, an APITypeHandler collects the responses from individual endpoints and constructs the array response required for the "arrayified" response. Because the API definition for an expression path demands an array response, the array generation activity happens even if there is only one target node or filtering results in only one response.

An APIRegistry is a catalog of APIEndpoint instances found within some scope (e.g., a process or, by proxy, a system). An APIRegistry groups APIEndpoint instances by type and version. An APIRegistry uses an APITypeHandler to manage the collection of APIEndpoint instances having a particular combination of API type and version. A given APIRegistry instance, and also therefore an APITypeHandler, could contain both BoundAPIEndpoint and ProxyAPIEndpoint instances.

An APIRegistry is itself a BoundAPIEndpoint providing an API that supports access to APITypeHandler and APIEndpoint resources.

Using the APIRegistry API, an external entity can determine the types, versions and URLs of various APIEndpoint instances cataloged by the APIRegistry.

ProxyAPIRegistry 62 is an implementation of an APIRegistry that exists in a business application. It receives registration request from BoundAPIEndpoints and is responsible for registering those endpoints with API Gateway 50.

API Gateway 50 is associated with an APIRegistry and serves two purposes in embodiments. First, it integrates with HTTP Server 51 as a handler for paths associated with REST APIs (e.g., "/api"). Second, it is itself a BoundAPIEndpoint providing a REST API that allows remote APIEndpoints to register with gateway 50. When a remote process registers an endpoint, APIGateway 50 instantiates a ProxyAPIEndpoint to represent the remote APIEndpoint and registers that proxy with the APIRegistry API Gateway 50 manages ProxyAPIEndpoint instances with the help of ProxyAPITypeHandler instances. While automated registration of component APIs is the ideal solution, API Gateway 50 can also support manual registration (via configuration, etc.) of external REST APIs entities that do not implement the APIEndpoint behavior disclosed herein. These external entities will not support the expression routing mechanism and so will behave in the same manner as singleton endpoints.

ProxyAPIGateway 63 is an implementation of APIGateway 50 that exists in a Business Application along with a ProxyAPIRegistry.

A ProxyAPITypeHandler 310 is an implementation of APITypeHandler used to manage ProxyAPIEndpoints (vs. BoundAPIEndpoints). When routing a single REST request to multiple nodes, a ProxyAPITypeHandler routes only to endpoints URLs having distinct combinations of host and port. This is because the ProxyAPIGateway on the target node will handle the routing of a single request to the matching endpoints on that target node. This reduces network traffic as well as duplicate responses.

Use Case Realizations

Register an API Endpoint

Figure 4:
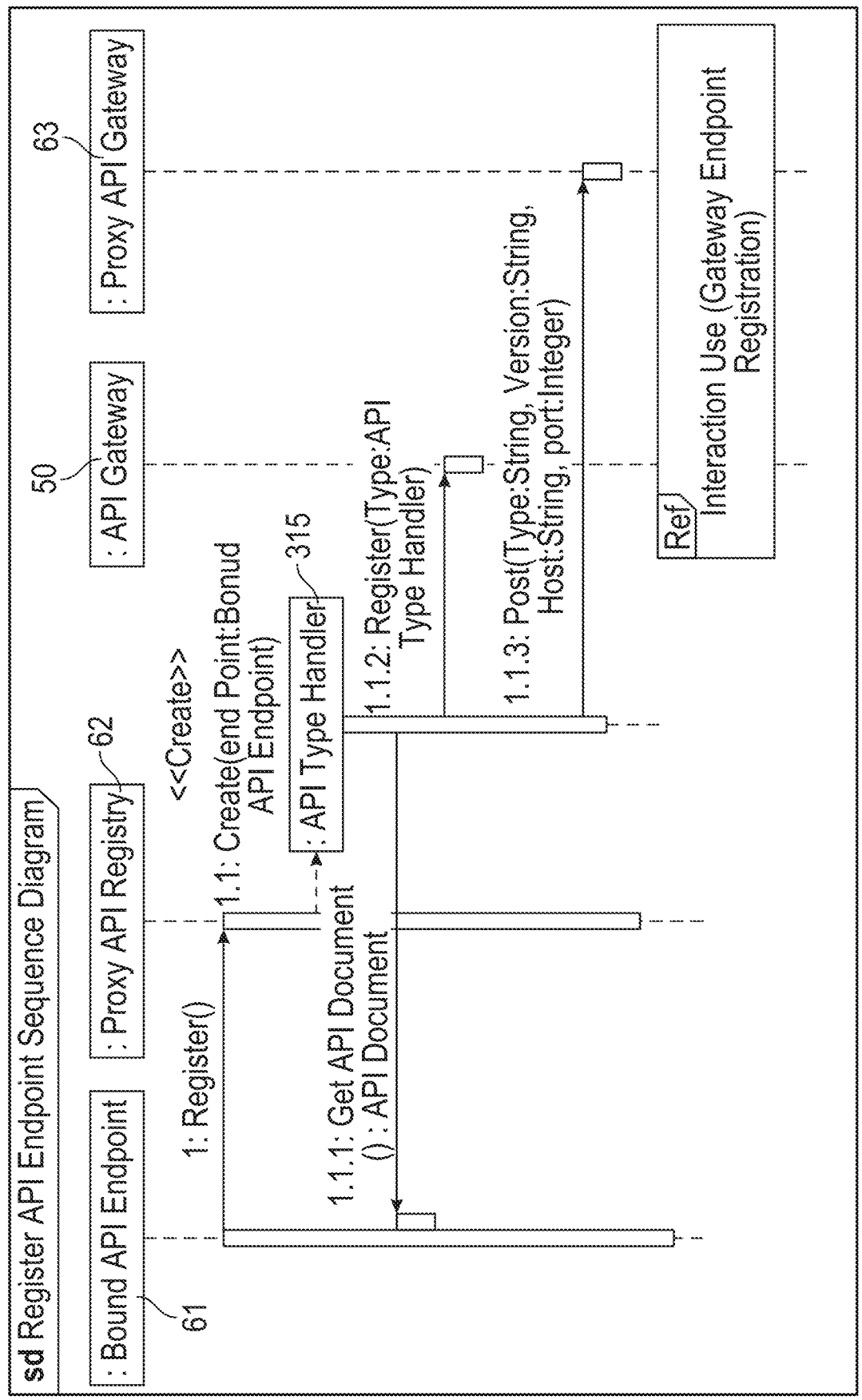
FIG. 4 is a sequence diagram illustrating functionality for registering an API endpoint in accordance to embodiments of the invention.
Figure 5:
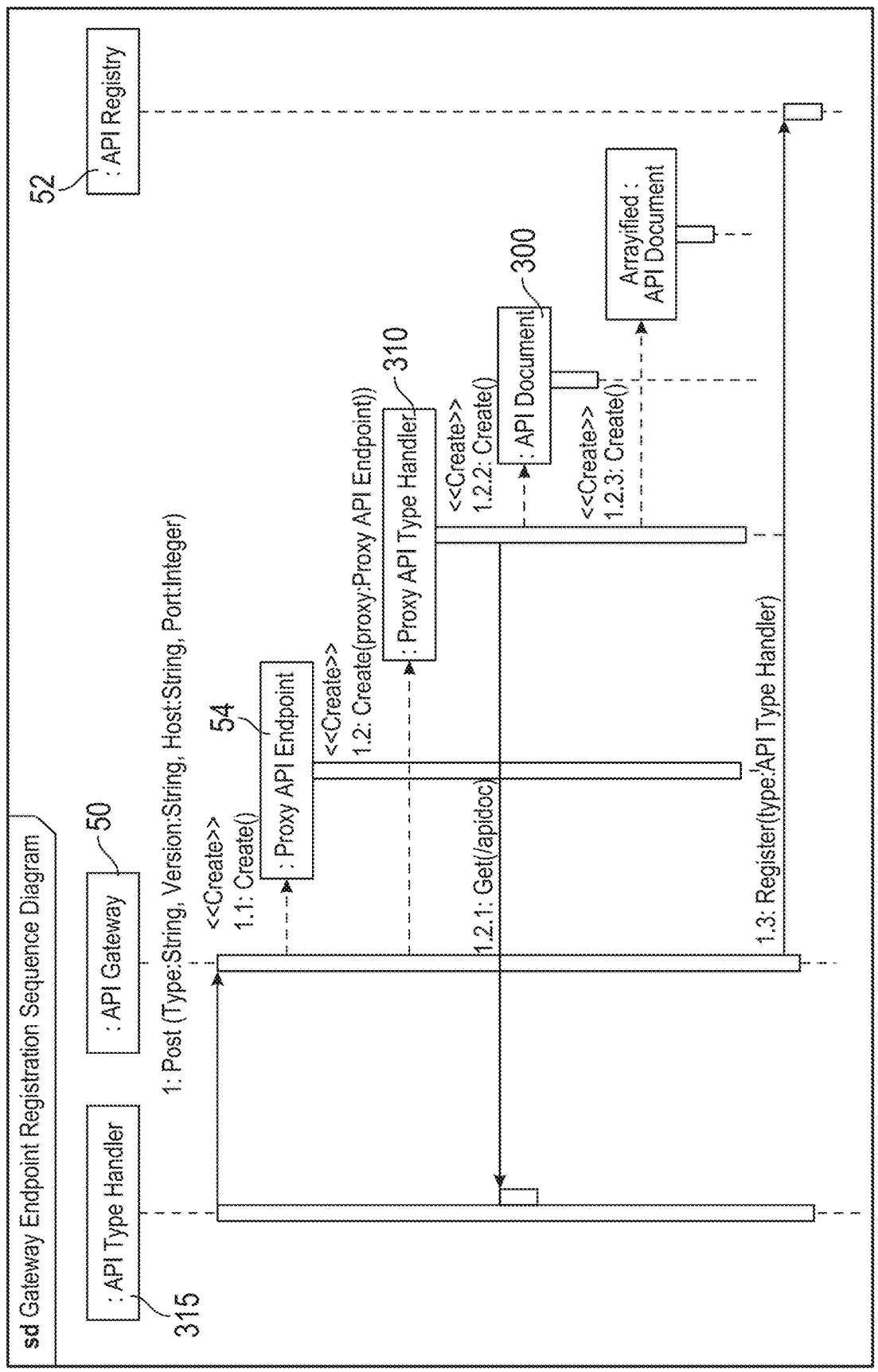
FIG. 5 is a sequence diagram illustrating functionality for registering the API Gateway in accordance to embodiments of the invention.

FIG. 4 is a sequence diagram illustrating functionality for registering an API endpoint in accordance to embodiments of the invention. FIG. 5 is a sequence diagram illustrating functionality for registering API Gateway 50 in accordance to embodiments of the invention. In embodiments, the functionality of the sequence diagram and flow diagrams of FIGS. 4 and 5 (and FIGS. 6-11 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The sequence of steps shown in FIGS. 4 and 5 is as follows:
1. A BoundAPIEndpoint within a Business Application registers itself with the ProxyAPIRegistry;
2. The ProxyAPIRegistery locates a APITypeHandler, allocating one if necessary;
3. The APITypeHandler obtains the APIDocument from the first constituent APIEndpoint;
4. The APITypeHandler uses HTTP to register the endpoint metadata with the remote APIGateway;
5. The APIGateway allocates a ProxyAPIEndpoint;
6. The remote APIGateway locates a ProxyAPITypeHandler, allocating one if necessary and registering the type handler with the APIRegistry, and registering the proxy endpoint with the type handler;
7. The ProxyAPIEndpoint will request the endpoint APIDocument from the first constituent ProxyAPIEndpoint;
8. The ProxyAPIEndpoint issues a request to the URL associated with the APIEndpoint in the Business Application;
9. The HTTP Server in the Business Application handles this request and forwards it to the ProxyAPIGateway;
10. The ProxyAPIgateway locates the appropriate APITypeHandler and forwards the request;

11. The APITypeHandler responds with the APIDocument;
12. The ProxyAPITypeHandler receives the APIDocument and from it constructs an "arrayified" version;
13. For the first, constituent ProxyAPIEndpoint, the ProxyAPITypeHandler constructs a server URL using the Gateway Process HTTP Server host and port and a wild-card expression path;
14. The ProxyAPITypeHandler constructs a server URL using the Gateway Process HTTP Server host and port and a UUID expression path;
15. The APITypeHandler in the Business Application periodically re-POSTS the registration with the remote APIGateway in order to forestall a timeout of the endpoint;
16. The APIGateway periodically checks the timestamps associated with ProxyAPIEndpoints and removes any that have timed out. Timed out endpoints are also removed from the ProxyAPITypeHandler and unused ProxyAPITypeHandlers are removed from the APIRegistry.

As an extension to the above use case, in order to register an API endpoint singleton, in step 3 above, the APIDocument supplied by the APIEndpoint has the property x-singleton of the document info section set to true. In step 12 above, the ProxyAPITypeHandler does not construct an "arrayified" document. In step 13 above, the ProxyAPITypeHandler constructs a server URL using the GatewayProcess HTTP Server host and port but having no expression path component.

Query an API Registry

Figure 6:
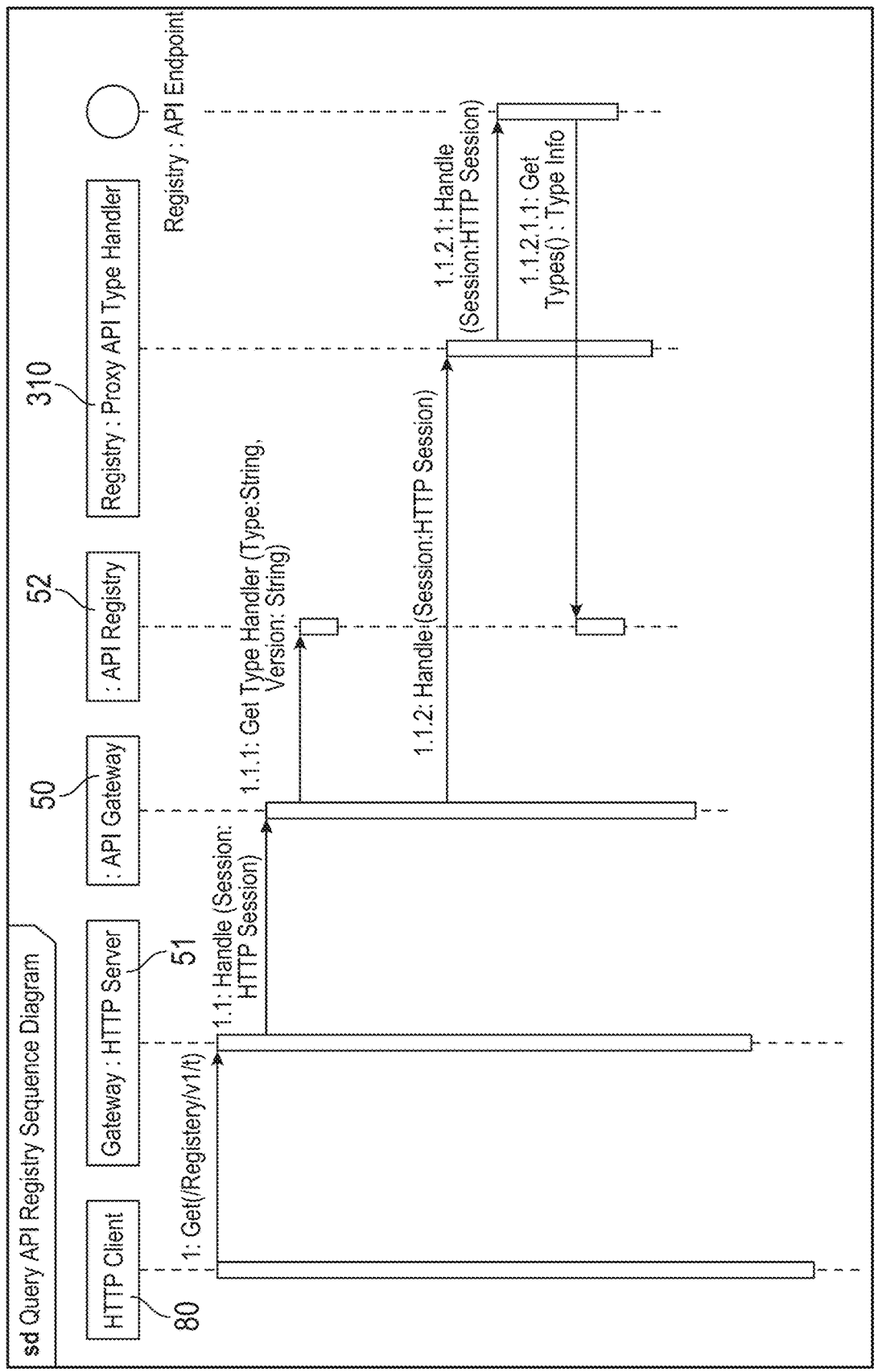
FIG. 6 is a sequence diagram illustrating functionality for querying an API registry in accordance to embodiments of the invention.

FIG. 6 is a sequence diagram illustrating functionality for querying an API registry in accordance with embodiments of the invention. The sequence of FIG. 6 is as follows:
1. An HTTPClient issues an HTTP GET request to the Gateway Process HTTP Server with a resource path referencing the APIRegistry API;
2. The HTTPServer in the Gateway Process passes the request to the APIGateway;
3. The APIGateway locates the appropriate APITypeHandler (corresponding to the APIRegistry);
4. The APITypeHandler locates the APIEndpoint corresponding to the APIRegistry;
5. The APIEndpoint queries state of the APIRegistry and constructs a response comprising information about each of the register types and versions;
6. The HTTPClient receives the response.

As an extension to the above use case, in order to filter query results, in step 1 above, the HTTPClient issues an HTTP GET request to the Gateway Process HTTP Server with a resource path referencing the APIRegistry API and with query parameters that filter the collection of types and versions.

As an extension to the above use case, in order to restrict the result scope, in step 1 above, the HTTPClient issues an HTTP GET request to the Gateway Process HTTP Server with a resource path referencing the APIRegistry API and with a resource path referencing some sub-resource of the type resource.

Access an API Endpoint

Figure 7:
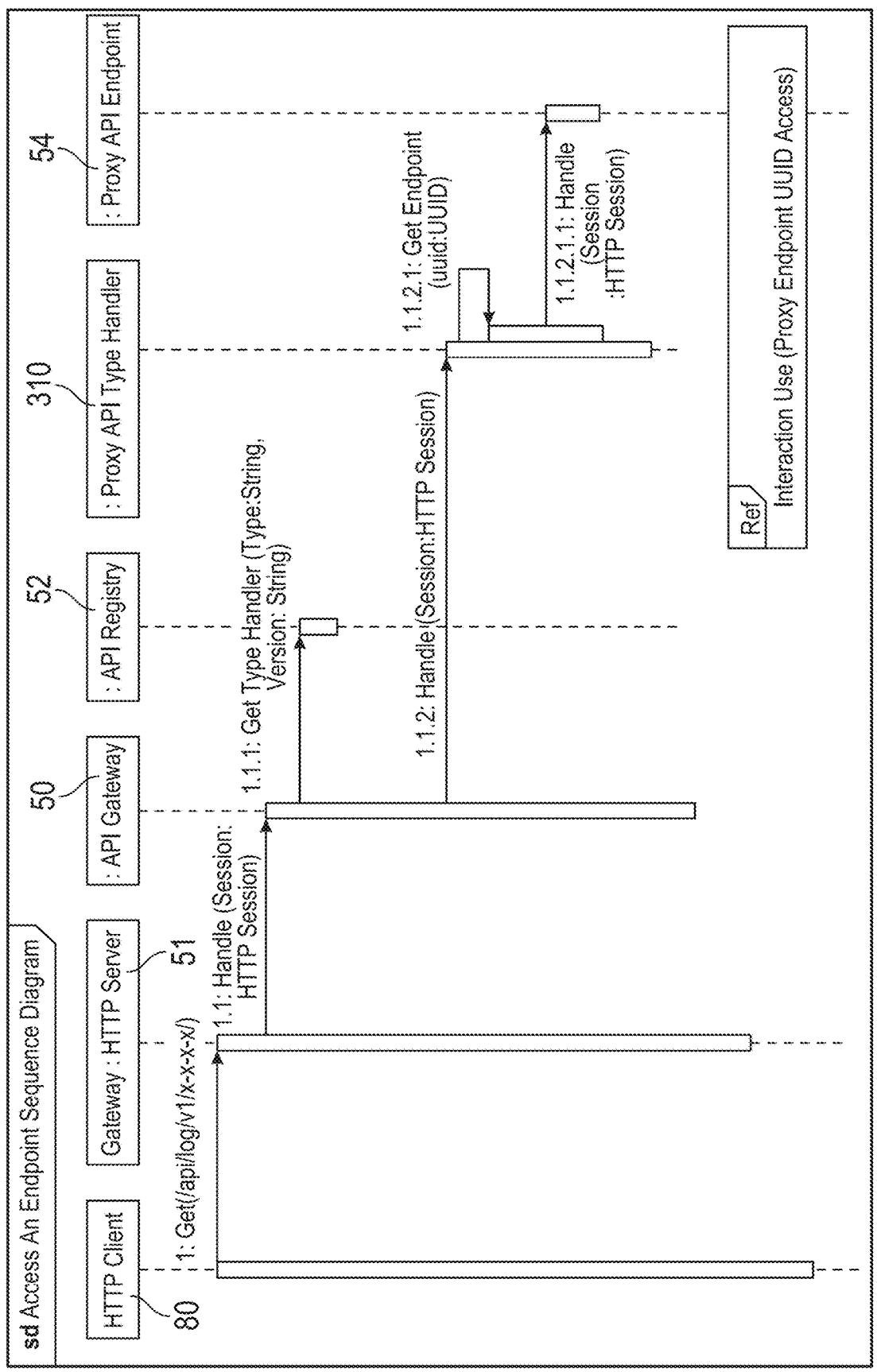
FIG. 7 is a sequence diagram illustrating functionality for accessing an API endpoint in accordance to embodiments of the invention.
Figure 8:
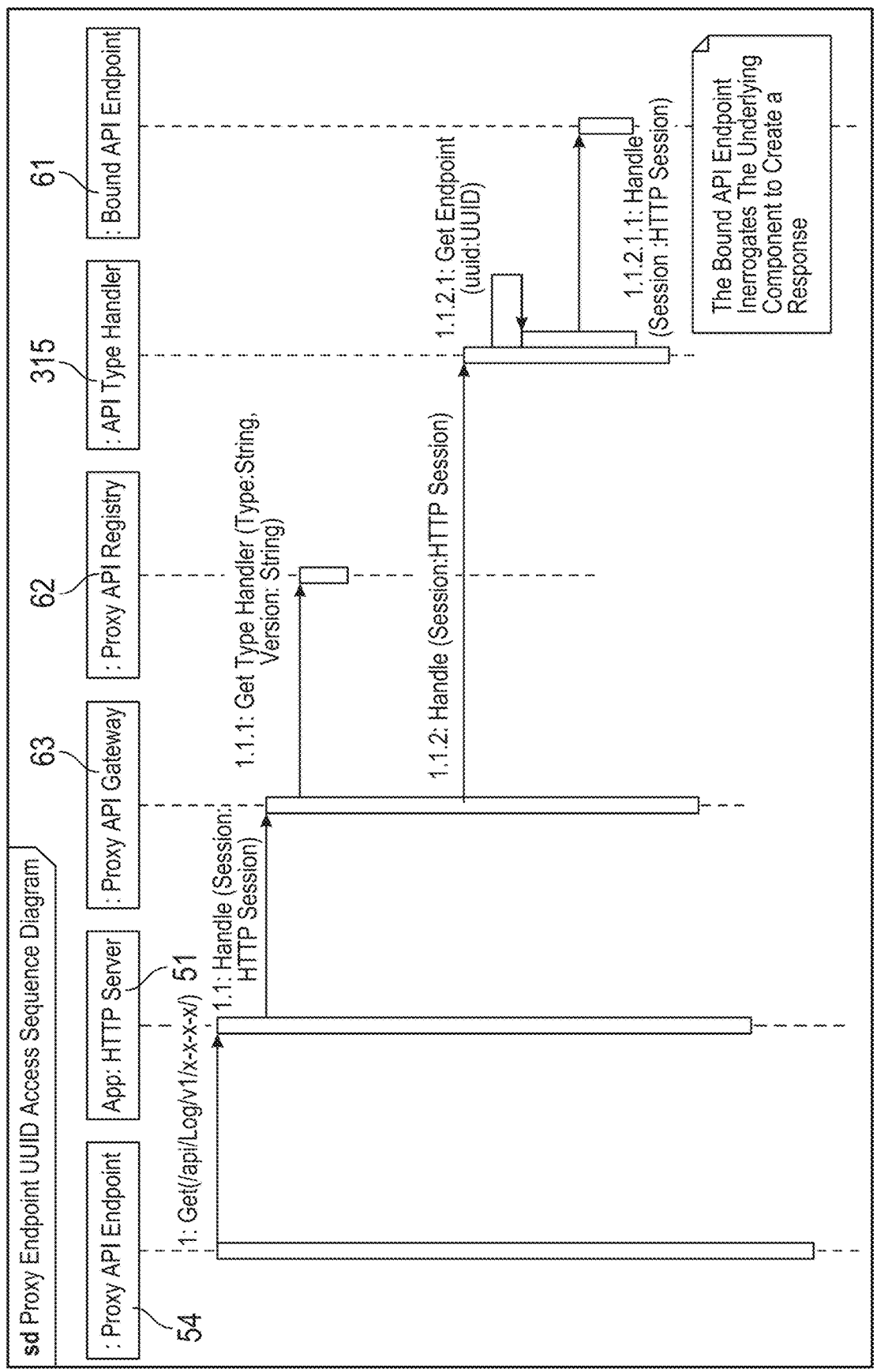
FIG. 8 is a sequence diagram illustrating functionality for the proxy endpoint UUID access in accordance to embodiments of the invention.

FIG. 7 is a sequence diagram illustrating functionality for accessing an API endpoint in accordance with embodiments of the invention. FIG. 8 is a sequence diagram illustrating functionality for the proxy endpoint UUID access in accordance to embodiments of the invention.
1. An HTTPClient directs an HTTP request to a APIEndpoint server instance URL (one containing a UUID in the expression component of the path) obtained via a query directed to the APIRegistry;
2. The HTTPServer in the Gateway Process passes the request to the APIGateway;
3. The APIGateway locates the appropriate APITypeHandler;
4. The APITypeHandler (a ProxyAPITypeHandler) uses the UUID component of the request path to locate the ProxyAPIEndpoint and passes the request to the proxy;
5. The ProxyAPIEndpoint issues an HTTP request to the APIEndpoint via the HTTPServer in the Business Application process;
6. The HTTPServer in the Business Application passes the request to the ProxyAPIGateway;
7. The ProxyAPIGateway locates the appropriate APITypeHandler;
8. The APITypeHandler uses the UUID component of the path to locate the APIEndpoint and passes the request to the endpoint;
9. The APIEndpoint interrogates the underlying component to construct a response;
10. The ProxyAPIEndpoint receives the response;
11. The HTTPClient receives the response.

As an extension to the above use case, in order to access API endpoint API documentation, in step 1 above, an HTTPClient directs an HTTP request to a APIEndpoint server URL obtained via a query directed to the APIRegistry and using the resource name "apidoc" to reference the APIDocument. In step 4 above, the ProxyAPITypeHandler intercepts the request and returns the APIDocument obtained from the first constituent ProxyAPIHandler As an extension to the above use case, in order to reduce the scope of response, in step 1 above, an HTTPClient directs an HTTP request to a APIEndpoint server URL obtained via a query directed to the APIRegistry but appends a sub-resource path. In step 9 above, the APIEndpoint interrogates the underlying component for just the requested sub-resource.

Access all API Endpoints

Figure 9:
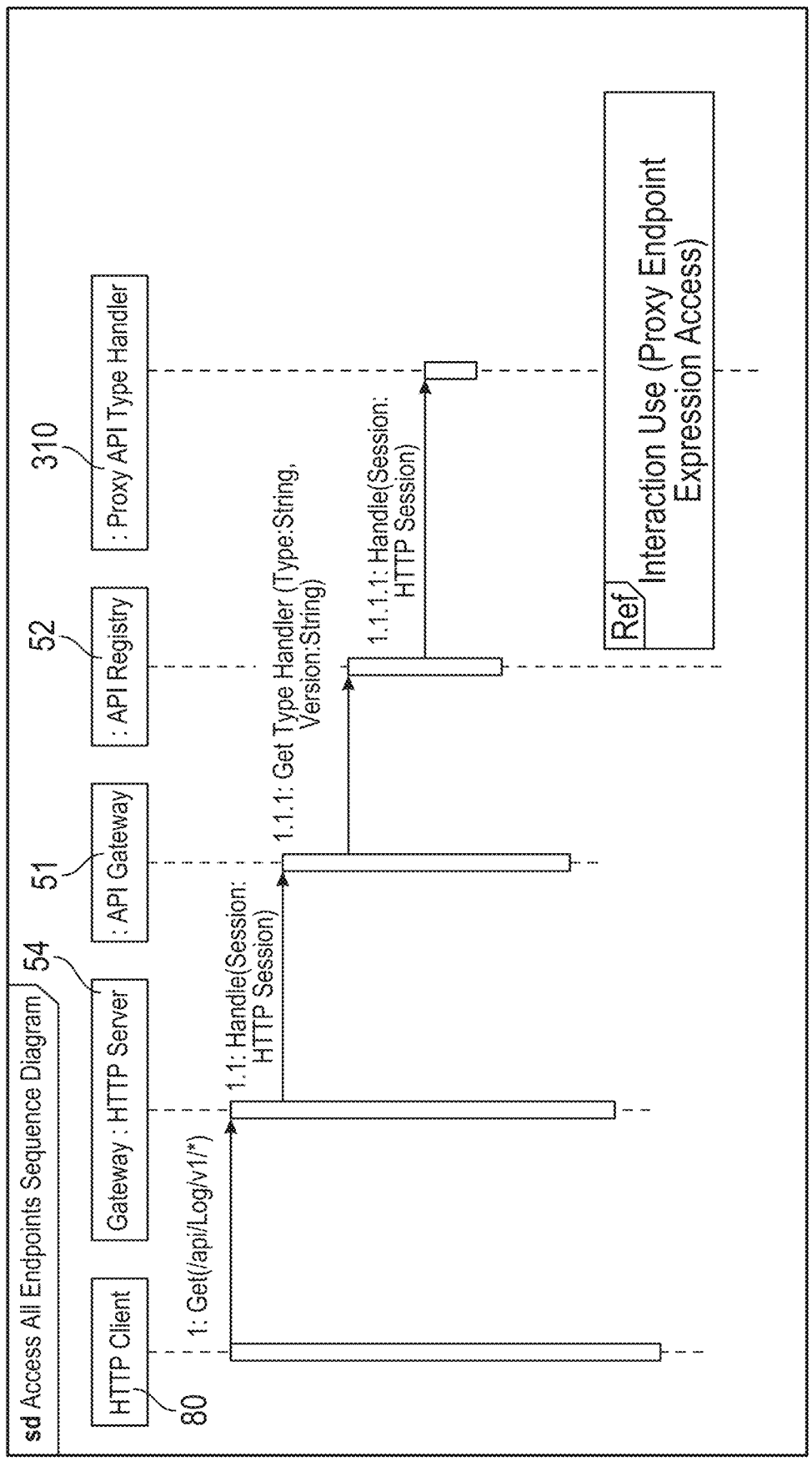
FIG. 9 is a sequence diagram illustrating functionality for accessing all API endpoints in accordance to embodiments of the invention.
Figure 10:
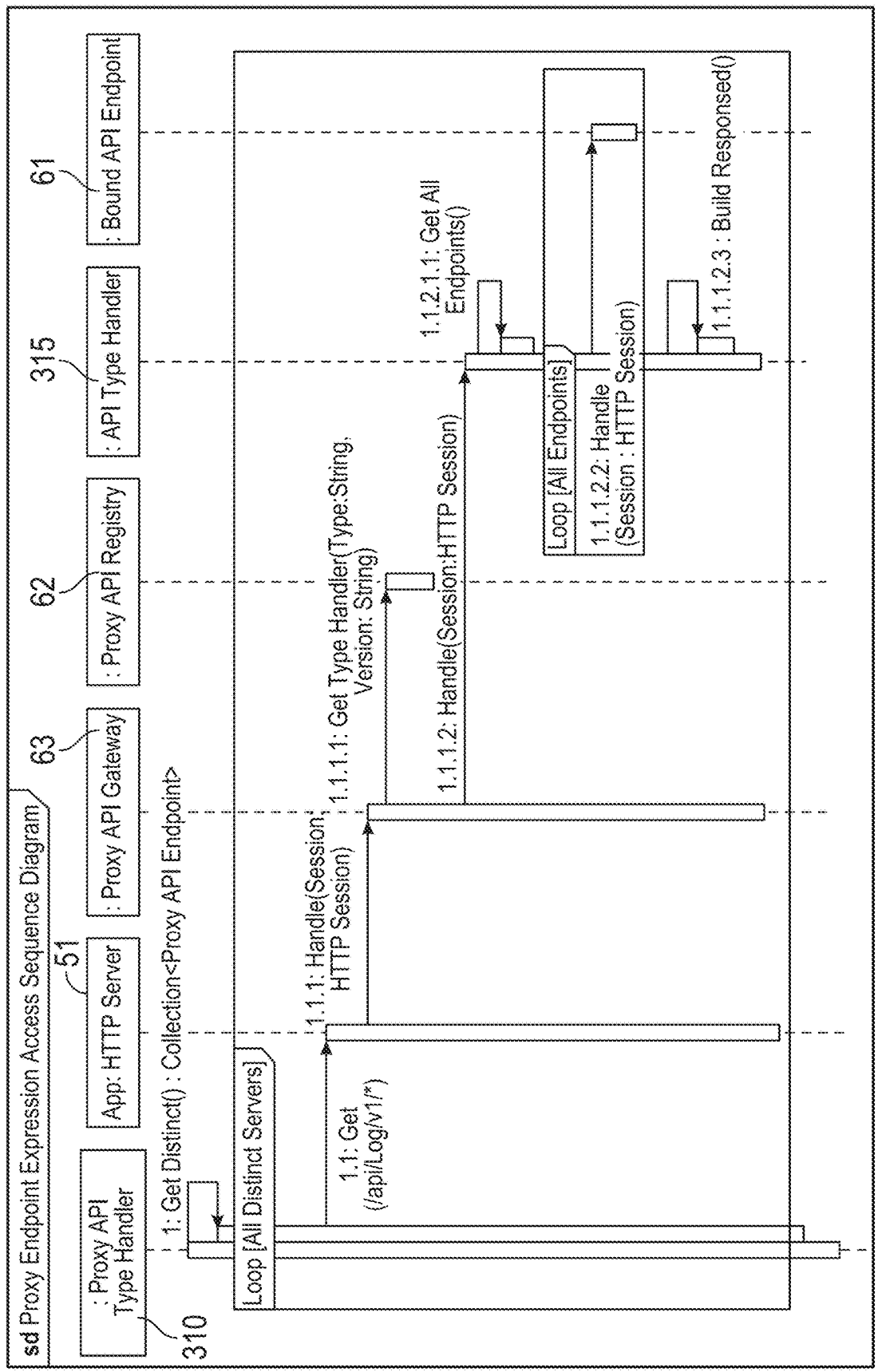
FIG. 10 is a sequence diagram illustrating functionality for the proxy endpoint expression access in accordance to embodiments of the invention.

FIG. 9 is a sequence diagram illustrating functionality for accessing all API endpoints in accordance with embodiments of the invention. FIG. 10 is a sequence diagram illustrating functionality for the proxy endpoint expression access in accordance to embodiments of the invention.
1. An HTTPClient directs an HTTP request to the APIEndpoint server wildcard expression URL obtained via a query directed to the APIRegistry;
2. The HTTPServer in the Gateway Process passes the request to the APIGateway;
3. The APIGateway locates the appropriate APITypeHandler (a ProxyAPITypeHandler);
4. The ProxyAPITypeHandler detects the expression (in this case, a wild-card) and constructs a distinct list of endpoints such that the list of associated Business Process URLs has unique entries for each host and port. This procedure eliminates duplicate responses from the ProxyAPIGateway that would otherwise arise from the local routing behavior of the ProxyAPIGateway;
5. The ProxyAPITypeHandler issues the client request to each of the distinct URLs;
6. The HTTPServer in each Business Process that receives a request passes the request to the ProxyAPIGateway;
7. The ProxyAPIGateway locates the appropriate APITypeHandler;
8. The APITypeHandler detects the wild-card part of the request URL and passes the request to all constituent APIEndpoints;

9. Each APIEndpoint interrogates the underlying component to construct a response;
10. The APITypeHandler aggregates the responses from all the APIEndpoints and responds to the request from corresponding ProxyAPIHandler;
11. The ProxyAPITypeHandler constructs an array of responses;
12. The HTTPClient receives the response.

As an extension to the above use case, in order to filter responses with a predicate expression, in step 1 above, the HTTPClient uses a predicate expression instead of a wild-card requested. In step 4, the ProxyAPITypeHandler detects the expression but proceeds as with the wild-card case. In step 8, the APITypeHandler detects the predicate and passes the predicate to its constituent APIEndpoints which then interrogate the underlying component. The APITypeHandler filters the list of constituent APIEndpoints to those that satisfy the predicate, constructing a response from that list.

As an extension to the above use case, in order to reduce the scope of response, in step 1 above, the HTTPClient appends a sub-resource path to the path expression (using either a wild-card or predicate expression). In step 9, the APIEndpoint interrogates the underlying component for just the requested sub-resource.

Figure 11:
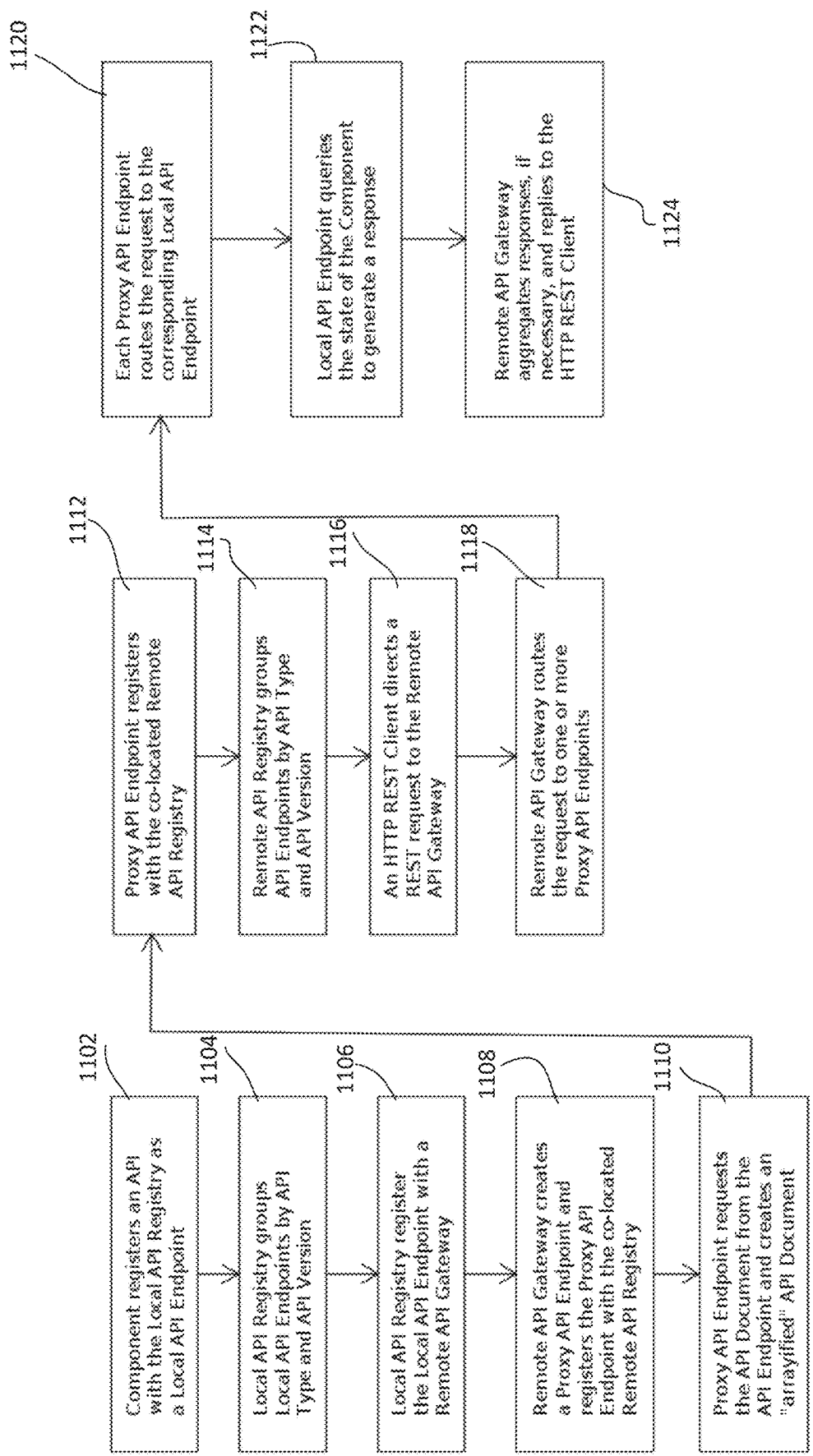
FIG. 11 is a flowchart of the overall functionality of REST API routing using the API Gateway in accordance to embodiments.

FIG. 11 is a flowchart of the overall functionality of REST API routing using API Gateway 50 in accordance to embodiments. The functionality of the flowchart of FIG. 11 is relative to "local" Bound API Endpoints (i.e., those in some business processes such as business application process 60 of FIG. 1) so that Gateway Process 20 is considered "remote".

At 1102, a software component registers an API with the local API registry 62 as a local API endpoint.

At 1104, the local API registry 62 groups local API endpoints by API type and API version.

At 1106, the remote API gateway 50 creates a proxy API endpoint 54 and registers the proxy API endpoint 54 with the co-located remote API registry 52.

At 1108, the remote API gateway 50 requests the API document 300 from the API endpoint 60 and creates an "arrayified" API document.

At 1112, the proxy API endpoint registers with the co-located remote API registry.

At 1114, the remote API registry groups the API endpoints by API type and API version.

At 1116, an HTTP REST client 80 directs a REST request to the remote API gateway 50.

At 1118, the remote API gateway 50 routes the request to one or more proxy API endpoints.

At 1120, each proxy API endpoint routes the request to the corresponding local API endpoint.

At 1122, the local API endpoint queries the state of the component to generate a response.

At 1124, the remote API gateway 50 aggregates the responses, if necessary, and replies to the HTTP REST client 80.

Use Examples

An example of using embodiments of the invention is in a enterprise-class cloud-based deployment of component-oriented containerized applications. In this context, a given container image may include a few components or tens of components. Within the deployment there may be many different types of such images and many instances of containers deployed in such a way that the number of containers vary over time depending on workloads, etc. (i.e., a typical large-scale elastic cloud deployment). In this kind of deployment, the physical assignment of containers to hardware and allocation of IP addresses is typically indeterminate.

As disclosed above, software components in embodiments of the invention may each have individual log handlers and these handlers could be exposed via a REST API. This means that each of the containers in embodiments may have a few or many log handler components and the number of containers could range from a few to tens and therefore there could be hundreds of log handler components throughout the system.

An administrator may want to increase the level of logging detail throughout the system (e.g., for diagnostic purposes). First of all the REST request to determine the current log level using the Linux command line utility curl would be as follows:

curl http://gateway-hostgateway-port/api/log/v1/*/level

This request will return any array of level values.

The REST request to change the log level throughout the system would be as follows:

curl -X POST http://gateway-host:gateway-port/api/log/v1/*/level?level=FINER

Assume the administrator wanted to use a less brute-force approach and change the log level only in components have a name "com.acme.session", the REST request would be as follows:

curl -X POST http://gateway-hostgateway-port/api/log/v1/name=com.acme.session/level?level=FINER Note that in these examples it makes no difference how many log handler components there are or where they are located. Also, this request will only be routed to containers that actually have one or more instance of the target API. The routing accomplishes this automatically.

Lastly, suppose there is a problem with a particular container, the log level for a specific container and component can be increased using the following:

curl -X POST http://gateway-host:gateway-port/api/log/v1/8810533c-b52a-11ec-b909-0242ac120002,name=com.acme.session/level?level=FINER Annotations The preferred mechanism for implementing a BoundAPIEndpoint using the Java programming language involves the use of annotations. Using a set of appropriately designed annotations, each Java interface or class method that should be exposed as an API constituent is adorned with annotations indicating the type of operation supported (e.g., GET, POST etc.), resource name, descriptive text for the purposes of documentation, etc. Method parameters are likewise annotated with types, descriptions, etc.

In embodiments, all of these annotations are assigned a runtime retention policy (i.e., @Retention(RUNTIME)) so that annotation metadata is present in the Java class definitions for annotated component classes and interfaces.

At the time a BoundAPIEndpoint registers with the ProxyAPIRegistry, the registry can inspect the class associated with the endpoint Java object and extract from that class definition the various methods that have REST API annotations. From the annotations, the registry can construct an API Document including resource names, supported operations, descriptions etc. Note that the definition of the endpoint class is only dependent on the annotations and is independent of the documentation standard used in the API Gateway architecture.

As disclosed, embodiments use a controller or "API Gateway" architecture which uses the REST abstraction to implement a message routing architecture, including a "wildcard" routing capability that, transparently to the invoking application, forwards requests to multiple REST endpoints and marshalls a single response. The wildcard capability is a specific example of a more generalized expression mechanism.

API Gateway 50 in accordance to embodiments support:
Registration/de-registration of REST-based Endpoints for the purpose of exposing those Endpoints to monitoring solutions or other such applications;
Allowing the registration of "singleton" Endpoints to reflect system designs that require singletons of certain services;
Transparent routing of requests simultaneously to all Endpoints supporting a particular API and the marshalling of responses as an array;
Alternatively routing requests to individual Endpoints;
For expression-based paths, automated generation of semantically consistent API documentation, such as an OpenAPI specification.

Business applications of the API Gateway include the management (monitoring and control) of complex microservice deployments such as those that use auto-scaling and otherwise have complex deployment characteristics.

With embodiments, because monitoring applications connect only to the controller/API Gateway 50, system management tools and other applications achieve location independence. This is due to the transparent routing of requests to multiple endpoints by API Gateway 50 and the corresponding marshalling of responses.

Embodiments allow for the simplification of system management tools and other applications due to the automated marshalling of responses from multiple endpoints. This enables off-the-shelf tools such as command line applications (e.g., curl on Linux) and web browsers to transparently access arbitrarily complex, multi-node systems.

Embodiments reduce security risk by limiting the need for direct access to endpoints and physical networks on which endpoints are located and have efficiency benefits over non-routing solutions that require participating entities to publish data to a centralized repository.

Embodiments contrast with existing solutions that either require monitoring applications to connect to individual endpoints or require endpoints to push data into a centralized repository. Known architectures with individual connections has the following disadvantages:

Applications have to organize the responses from multiple endpoints, e.g. building an JSON array from multiple responses;
In a dynamic environment (e.g., an auto-scaled cluster), applications need to track the location of individual REST servers and somehow track their coming and going;
Monitored nodes may need expose their REST API to networks outside the internal networking of the cluster. This provides an additional attack surface for bad actors.

Further, known solutions that do not incorporate the functionality in accordance to embodiments generally have two choices:
(1) Assign each application to its own API server. In this case a component-oriented application would have to define a monolithic REST API and in that API define resource paths for each of its constituent components (e.g., log handlers). This is unwieldy, repetitive and error prone. A client wanting to request a resource from all similar components would create a unique URL for each component where many would share the same host and port but the resource path would vary depending on the location of that component in the monolithic API.
(2) Assign each component its own API server. This is unwieldy from an administrative prospective, if for no other reason than a proliferation of port numbers. A client wanting to request a resource from all similar components would create a unique URL for each component where the resource path was the same but the host and port number would vary.

In each case, a client would have to make multiple requests, one for each component path in the former case or one for each component server in the latter case. This is extremely inefficient. It also requires the client to perform aggregation of responses.

In contrast, embodiments provide a component-aware aggregation solution that allows clients to be agnostic to the number and locations of business applications or application components implementing a particular API. The use of API Gateway 50 as a single access point enables trivially simple client implementations (e.g., standard browsers and command line tools), location transparency, and security benefits.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

Appendix I. Expression Syntax

<path> ::= "/api/" + <api-type-name> + "/" + <type-version> + "/" + <routing-expression> + <resource-path>

<api-type> ::= a string of alpha characters

<type-version> ::= "v" + a number

<routing-expression> ::= <uuid-string> | <wild-card> | <resource-predicate-list>

<uuid-string> ::= a UUID represented as a string

<wild-card> ::= "*"

<resource-predicate-list> ::= <resource-predicate> + ["," + <resource-predicate>]

<resource-predicate> ::= <resource-dot-path> + <operator> + <literal-value>

<resource-dot-path>[1] ::= <resource-name> + ["." + <resource-dot-path>]

<resource-name> ::= a string

<operator> ::= <eq> | <ne> | <lt> | <lte> | <gt> | <gte> | <and> | <or> | <nand> | <nor> | "("<operator>")"

<eq> ::= "=" | %3D

<ne> ::= "%21%3D"

<lt> ::= "%3C"

<lte> ::= "%3C%3D"

<gt> ::= "%3E"

<gte> ::= "%3E%3D"

<and> ::= "%20AND%20"

<or> ::= "%20OR%20"

<nand> ::= "%20NAND%20"

<nor> ::= "%20NOR%20"

<literal-value> ::= a string

<resource-path> ::= "/" + <resource-name> [ + <resource-path> ]

---

1 A "resource-dot-path" is simply a URI path component that uses a '.' as a separator rather than a '/'. This is needed to distinguish the a path in the predicate component of a URI from the URI itself.

Appendix II. Example Endpoint API

```
{
    "openapi": "3.0.3",
    "info": {
        "title": "Component logging",
        "description": "Component-level logging handler",
        "version": "v1",
        "x-type": "log",
        "x-refresh-interval-milliseconds": 1000,
        "x-singleton": false
    },
    "paths": {
        "/ID": {
            "description": "Unique identity",
            "get": {
                "operationId": "getID",
                "description": "Get the value of ID",
                "responses": {
                    "200": {
                        "description": "A UUID",
                        "content": {
                            "application/json": {
                                "schema": {
                                    "$ref": "#/components/schemas/StdUUID"
                                }
                            }
                        }
                    },
                    "default": {
                        "description": "Unexpected error"
                    }
                }
            },
            "x-group": "",
            "x-group-rank": 0
        },
        "/componentName": {
            "description": "Component name",
            "get": {
                "operationId": "getComponentName",
                "description": "Get the value of componentName",
                "responses": {
                    "200": {
                        "description": "A String",
                        "content": {
                            "application/json": {
                                "schema": {
                                    "$ref": "#/components/schemas/StdString"
                                }
                            }
                        }
                    }
                },
```

```
                "default": {
                    "description": "Unexpected error"
                }
            }
        },
        "x-group": "",
        "x-group-rank": 0
    },
    "/packageFilter": {
        "description": "Java package filter",
        "get": {
            "operationId": "getPackageFilter",
            "description": "Get the value of packageFilter",
            "responses": {
                "200": {
                    "description": "A String",
                    "content": {
                        "application/json": {
                            "schema": {
                                "$ref": "#/components/schemas/StdString"
                            }
                        }
                    }
                },
                "default": {
                    "description": "Unexpected error"
                }
            }
        },
        "post": {
            "operationId": "setPackageFilter",
            "description": "set a string",
            "parameters": [
                {
                    "name": "packageFilter",
                    "in": "query",
                    "description": "a string value",
                    "schema": {
                        "$ref": "#/components/schemas/StdString"
                    },
                    "required": true,
                    "deprecated": false
                }
            ],
            "responses": {
                "200": {
                    "description": "returns a string",
                    "content": {
                        "application/json": {
                            "schema": {
                                "$ref": "#/components/schemas/StdString"
                            }
                        }
```

```
                    }
                },
                "default": {
                    "description": "Unexpected error"
                }
            }
        },
        "patch": {
            "operationId": "setPackageFilter",
            "description": "set a string",
            "parameters": [
                {
                    "name": "packageFilter",
                    "in": "query",
                    "description": "a string value",
                    "schema": {
                        "$ref": "#/components/schemas/StdString"
                    },
                    "required": true,
                    "deprecated": false
                }
            ],
            "responses": {
                "200": {
                    "description": "returns a string",
                    "content": {
                        "application/json": {
                            "schema": {
                                "$ref": "#/components/schemas/StdString"
                            }
                        }
                    }
                },
                "default": {
                    "description": "Unexpected error"
                }
            }
        },
        "x-group": "",
        "x-group-rank": 0
    },
    "/level": {
        "description": "Log level filter",
        "get": {
            "operationId": "getLogLevel",
            "description": "Get the value of level",
            "responses": {
                "200": {
                    "description": "A String",
                    "content": {
                        "application/json": {
                            "schema": {
                                "$ref": "#/components/schemas/StdString"
```

```
                    }
                }
            }
        },
        "default": {
            "description": "Unexpected error"
        }
    }
},
"post": {
    "operationId": "setLevel",
    "description": "set a string",
    "parameters": [
        {
            "name": "level",
            "in": "query",
            "description": "a string value",
            "schema": {
                "$ref": "#/components/schemas/StdString"
            },
            "required": true,
            "deprecated": false
        }
    ],
    "responses": {
        "200": {
            "description": "returns a string",
            "content": {
                "application/json": {
                    "schema": {
                        "$ref": "#/components/schemas/StdString"
                    }
                }
            }
        },
        "default": {
            "description": "Unexpected error"
        }
    }
},
"patch": {
    "operationId": "setLevel",
    "description": "set a string",
    "parameters": [
        {
            "name": "level",
            "in": "query",
            "description": "a string value",
            "schema": {
                "$ref": "#/components/schemas/StdString"
            },
            "required": true,
            "deprecated": false
```

```
                    }
                ],
                "responses": {
                    "200": {
                        "description": "returns a string",
                        "content": {
                            "application/json": {
                                "schema": {
                                    "$ref": "#/components/schemas/StdString"
                                }
                            }
                        }
                    },
                    "default": {
                        "description": "Unexpected error"
                    }
                }
            },
            "x-group": "",
            "x-group-rank": 0
        }
    },
    "components": {
        "schemas": {
            "LogEventMonitor": {
                "properties": {
                    "level": {
                        "$ref": "#/components/schemas/StdString"
                    },
                    "componentName": {
                        "$ref": "#/components/schemas/StdString"
                    },
                    "ID": {
                        "$ref": "#/components/schemas/StdUUID"
                    },
                    "packageFilter": {
                        "$ref": "#/components/schemas/StdString"
                    }
                }
            },
            "StdInteger": {
                "type": "integer",
                "format": "int32"
            },
            "StdString": {
                "type": "string"
            },
            "StdNumber": {
                "type": "number",
                "format": "float"
            },
            "StdJSON": {
                "type": "string"
```

```
        },
        "StdUUID": {
            "type": "string"
        }
    }
}
```

Appendix III. Example "Arrayified" Endpoint API

```
{
    "openapi": "3.0.3",
    "info": {
        "title": "Component logging",
        "description": "Component-level logging handler",
        "version": "v1",
        "x-type": "log",
        "x-refresh-interval-milliseconds": 1000,
        "x-singleton": false
    },
    "paths": {
        "/ID": {
            "description": "Unique identity",
            "get": {
                "operationId": "getID",
                "description": "Get the value of ID",
                "responses": {
                    "200": {
                        "description": "A UUID",
                        "content": {
                            "application/json": {
                                "schema": {
                                    "type": "array",
                                    "items": {
                                        "$ref": "#/components/schemas/StdUUID"
                                    }
                                }
                            }
                        }
                    },
                    "default": {
                        "description": "Unexpected error"
                    }
                }
            },
            "x-group": "",
            "x-group-rank": 0
        },
        "/componentName": {
            "description": "Component name",
            "get": {
                "operationId": "getComponentName",
                "description": "Get the value of componentName",
                "responses": {
                    "200": {
                        "description": "A String",
                        "content": {
                            "application/json": {
                                "schema": {
                                    "type": "array",
```

```
                    "items": {
                        "$ref":
"#/components/schemas/StdString"
                    }
                }
            }
        }
    },
    "default": {
        "description": "Unexpected error"
    }
}
        },
        "x-group": "",
        "x-group-rank": 0
    },
    "/packageFilter": {
        "description": "Java package filter",
        "get": {
            "operationId": "getPackageFilter",
            "description": "Get the value of packageFilter",
            "responses": {
                "200": {
                    "description": "A String",
                    "content": {
                        "application/json": {
                            "schema": {
                                "type": "array",
                                "items": {
                                    "$ref":
"#/components/schemas/StdString"
                                }
                            }
                        }
                    }
                },
                "default": {
                    "description": "Unexpected error"
                }
            }
        },
        "post": {
            "operationId": "setPackageFilter",
            "description": "set a string",
            "parameters": [
                {
                    "name": "packageFilter",
                    "in": "query",
                    "description": "a string value",
                    "schema": {
                        "$ref": "#/components/schemas/StdString"
                    },
                    "required": true,
```

```
                    "deprecated": false
                }
            ],
            "responses": {
                "200": {
                    "description": "returns a string",
                    "content": {
                        "application/json": {
                            "schema": {
                                "$ref": "#/components/schemas/StdString"
                            }
                        }
                    }
                },
                "default": {
                    "description": "Unexpected error"
                }
            }
        },
        "patch": {
            "operationId": "setPackageFilter",
            "description": "set a string",
            "parameters": [
                {
                    "name": "packageFilter",
                    "in": "query",
                    "description": "a string value",
                    "schema": {
                        "$ref": "#/components/schemas/StdString"
                    },
                    "required": true,
                    "deprecated": false
                }
            ],
            "responses": {
                "200": {
                    "description": "returns a string",
                    "content": {
                        "application/json": {
                            "schema": {
                                "$ref": "#/components/schemas/StdString"
                            }
                        }
                    }
                },
                "default": {
                    "description": "Unexpected error"
                }
            }
        },
        "x-group": "",
        "x-group-rank": 0
    },
```

```
    "/level": {
        "description": "Log level filter",
        "get": {
            "operationId": "getLogLevel",
            "description": "Get the value of level",
            "responses": {
                "200": {
                    "description": "A String",
                    "content": {
                        "application/json": {
                            "schema": {
                                "type": "array",
                                "items": {
                                    "$ref":
"#/components/schemas/StdString"
                                }
                            }
                        }
                    }
                },
                "default": {
                    "description": "Unexpected error"
                }
            }
        },
        "post": {
            "operationId": "setLevel",
            "description": "set a string",
            "parameters": [
                {
                    "name": "level",
                    "in": "query",
                    "description": "a string value",
                    "schema": {
                        "$ref": "#/components/schemas/StdString"
                    },
                    "required": true,
                    "deprecated": false
                }
            ],
            "responses": {
                "200": {
                    "description": "returns a string",
                    "content": {
                        "application/json": {
                            "schema": {
                                "$ref": "#/components/schemas/StdString"
                            }
                        }
                    }
                },
                "default": {
                    "description": "Unexpected error"
```

```
                }
            }
        },
        "patch": {
            "operationId": "setLevel",
            "description": "set a string",
            "parameters": [
                {
                    "name": "level",
                    "in": "query",
                    "description": "a string value",
                    "schema": {
                        "$ref": "#/components/schemas/StdString"
                    },
                    "required": true,
                    "deprecated": false
                }
            ],
            "responses": {
                "200": {
                    "description": "returns a string",
                    "content": {
                        "application/json": {
                            "schema": {
                                "$ref": "#/components/schemas/StdString"
                            }
                        }
                    }
                },
                "default": {
                    "description": "Unexpected error"
                }
            }
        },
        "x-group": "",
        "x-group-rank": 0
    }
},
"components": {
    "schemas": {
        "LogEventMonitor": {
            "properties": {
                "level": {
                    "$ref": "#/components/schemas/StdString"
                },
                "componentName": {
                    "$ref": "#/components/schemas/StdString"
                },
                "ID": {
                    "$ref": "#/components/schemas/StdUUID"
                },
                "packageFilter": {
                    "$ref": "#/components/schemas/StdString"
```

```
                    }
                }
            },
            "StdInteger": {
                "type": "integer",
                "format": "int32"
            },
            "StdString": {
                "type": "string"
            },
            "StdNumber": {
                "type": "number",
                "format": "float"
            },
            "StdJSON": {
                "type": "string"
            },
            "StdUUID": {
                "type": "string"
            }
        }
    }
}
```

Appendix IV. API Registry API Specification

```
{
    "openapi": "3.0.3",
    "info": {
        "title": "API Registry",
        "description": "A registry of API endpoints",
        "version": "v1",
        "x-type": "registry",
        "x-refresh-interval-milliseconds": 1000,
        "x-singleton": true
    },
    "servers": [
        {
            "url": "http://localhost:9090/api/registry/v1"
        }
    ],
    "paths": {
        "/types/{key}": {
            "description": "A specific element from a collection of APIType",
            "get": {
                "operationId": "getType",
                "description": "Get an instance of APIType",
                "parameters": [
                    {
                        "name": "key",
                        "in": "path",
                        "description": "A type/version key",
                        "schema": {
                            "$ref": "#/components/schemas/StdString"
                        },
                        "required": true,
                        "deprecated": false
                    },
                    {
                        "name": "key",
                        "in": "path",
                        "description": "A type/version key",
                        "schema": {
                            "$ref": "#/components/schemas/StdString"
                        },
                        "required": true,
                        "deprecated": false
                    }
                ],
                "responses": {
                    "200": {
                        "description": "An object",
                        "content": {
                            "application/json": {
                                "schema": {
                                    "$ref": "#/components/schemas/APIType"
                                }
```

```
                        }
                    }
                },
                "default": {
                    "description": "Unexpected error"
                }
            }
        },
        "x-group": "",
        "x-group-rank": 0
    },
    "/types/{key}/description": {
        "description": "Description of the endpoint API",
        "get": {
            "operationId": "getDescription",
            "description": "Get the value of description",
            "parameters": [
                {
                    "name": "key",
                    "in": "path",
                    "description": "A type/version key",
                    "schema": {
                        "$ref": "#/components/schemas/StdString"
                    },
                    "required": true,
                    "deprecated": false
                }
            ],
            "responses": {
                "200": {
                    "description": "A String",
                    "content": {
                        "application/json": {
                            "schema": {
                                "$ref": "#/components/schemas/StdString"
                            }
                        }
                    }
                },
                "default": {
                    "description": "Unexpected error"
                }
            }
        },
        "x-group": "properties",
        "x-group-rank": 3
    },
    "/types/{key}/type": {
        "description": "API type for this collection of endpoints",
        "get": {
            "operationId": "getAPIType",
            "description": "Get the value of type",
            "parameters": [
```

```
            {
                "name": "key",
                "in": "path",
                "description": "A type/version key",
                "schema": {
                    "$ref": "#/components/schemas/StdString"
                },
                "required": true,
                "deprecated": false
            }
        ],
        "responses": {
            "200": {
                "description": "A String",
                "content": {
                    "application/json": {
                        "schema": {
                            "$ref": "#/components/schemas/StdString"
                        }
                    }
                }
            },
            "default": {
                "description": "Unexpected error"
            }
        }
    },
    "x-group": "properties",
    "x-group-rank": 0
},
"/types/{key}/title": {
    "description": "Title of the endpoint API",
    "get": {
        "operationId": "getTitle",
        "description": "Get the value of title",
        "parameters": [
            {
                "name": "key",
                "in": "path",
                "description": "A type/version key",
                "schema": {
                    "$ref": "#/components/schemas/StdString"
                },
                "required": true,
                "deprecated": false
            }
        ],
        "responses": {
            "200": {
                "description": "A String",
                "content": {
                    "application/json": {
                        "schema": {
```

```
                            "$ref": "#/components/schemas/StdString"
                        }
                    }
                }
            },
            "default": {
                "description": "Unexpected error"
            }
        }
    },
    "x-group": "properties",
    "x-group-rank": 2
},
"/types": {
    "description": "API types available via this registry",
    "get": {
        "operationId": "getTypes",
        "description": "Get a collection of APIType",
        "responses": {
            "200": {
                "description": "Get a collection of APIType",
                "content": {
                    "application/json": {
                        "schema": {
                            "type": "array",
                            "items": {
                                "$ref": "#/components/schemas/APIType"
                            }
                        }
                    }
                }
            },
            "default": {
                "description": "Unexpected error"
            }
        }
    },
    "x-group": "",
    "x-group-rank": 0
},
"/types/{key}/singleton": {
    "description": "Is this type a singleton",
    "get": {
        "operationId": "isSingleton",
        "description": "Get the value of singleton",
        "parameters": [
            {
                "name": "key",
                "in": "path",
                "description": "A type/version key",
                "schema": {
                    "$ref": "#/components/schemas/StdString"
```

```
                },
                "required": true,
                "deprecated": false
            }
        ],
        "responses": {
            "200": {
                "description": "A Boolean",
                "content": {
                    "application/json": {
                        "schema": {
                            "$ref": "#/components/schemas/StdString"
                        }
                    }
                }
            },
            "default": {
                "description": "Unexpected error"
            }
        }
    },
    "x-group": "properties",
    "x-group-rank": 3
},
"/types/{key}/servers": {
    "description": "Array of server URLs",
    "get": {
        "operationId": "getServers",
        "description": "Get the value of servers",
        "parameters": [
            {
                "name": "key",
                "in": "path",
                "description": "A type/version key",
                "schema": {
                    "$ref": "#/components/schemas/StdString"
                },
                "required": true,
                "deprecated": false
            }
        ],
        "responses": {
            "200": {
                "description": "A RawJSON",
                "content": {
                    "application/json": {
                        "schema": {
                            "$ref": "#/components/schemas/StdJSON"
                        }
                    }
                }
            },
            "default": {
```

```
                    "description": "Unexpected error"
                }
            }
        },
        "x-group": "properties",
        "x-group-rank": 3
    },
    "/types/{key}/version": {
        "description": "API version for this collection of endpoints",
        "get": {
            "operationId": "getAPIVersion",
            "description": "Get the value of version",
            "parameters": [
                {
                    "name": "key",
                    "in": "path",
                    "description": "A type/version key",
                    "schema": {
                        "$ref": "#/components/schemas/StdString"
                    },
                    "required": true,
                    "deprecated": false
                }
            ],
            "responses": {
                "200": {
                    "description": "A String",
                    "content": {
                        "application/json": {
                            "schema": {
                                "$ref": "#/components/schemas/StdString"
                            }
                        }
                    }
                },
                "default": {
                    "description": "Unexpected error"
                }
            }
        },
        "x-group": "properties",
        "x-group-rank": 1
    }
},
"components": {
    "schemas": {
        "StdInteger": {
            "type": "integer",
            "format": "int32"
        },
        "StdString": {
            "type": "string"
        },
```

```
        "StdNumber": {
            "type": "number",
            "format": "float"
        },
        "StdJSON": {
            "type": "string"
        },
        "DefaultAPIEndpointRegistry": {
            "properties": {
                "types": {
                    "type": "array",
                    "items": {
                        "$ref": "#/components/schemas/APIType"
                    }
                }
            }
        },
        "APIType": {
            "properties": {
                "singleton": {
                    "$ref": "#/components/schemas/StdBoolean"
                },
                "servers": {
                    "$ref": "#/components/schemas/StdJSON"
                },
                "description": {
                    "$ref": "#/components/schemas/StdString"
                },
                "type": {
                    "$ref": "#/components/schemas/StdString"
                },
                "title": {
                    "$ref": "#/components/schemas/StdString"
                },
                "version": {
                    "$ref": "#/components/schemas/StdString"
                }
            }
        },
        "StdUUID": {
            "type": "string"
        }
    }
  }
}
```

Appendix V. API Registry Example

```
[
    {
        "singleton": true,
        "servers": [
            "http://localhost:9090/api/registry/v1"
        ],
        "description": "A registry of API endpoints",
        "type": "registry",
        "title": "API Registry",
        "version": "v1"
    },
    {
        "singleton": false,
        "servers": [
            "http://localhost:9090/api/log/v1/*",
            "http://localhost:9090/api/log/v1/cd5b5d49-6d20-4bc1-821c-80bbf733a013",
            "http://localhost:9090/api/log/v1/89058956-2aff-453a-9eaa-45fac00b7bab",
            "http://localhost:9090/api/log/v1/83736b7a-f9d9-4aeb-9522-8f57bd07f11d",
            "http://localhost:9090/api/log/v1/2ab21495-4809-4e82-ae31-d4b121083e10",
            "http://localhost:9090/api/log/v1/a9cd4ff8-19c5-4c71-b240-29543ba7c031",
            "http://localhost:9090/api/log/v1/058c345e-047e-45ec-8a88-cfaff54ddd1d",
            "http://localhost:9090/api/log/v1/e96a4655-baf4-4696-ae77-d7a77f9aa5ea",
            "http://localhost:9090/api/log/v1/e2585f36-d29e-4e09-a914-010f7655cdc4",
            "http://localhost:9090/api/log/v1/9fffd987-4915-49be-8947-e77527507900",
            "http://localhost:9090/api/log/v1/7d891ebe-b8a0-4989-a5dd-3bb2fe351658"
        ],
        "description": "Component-level logging handler",
        "type": "log",
        "title": "Component logging",
        "version": "v1"
    },
    {
        "singleton": true,
        "servers": [
            "http://localhost:9090/api/logservice/v1"
        ],
        "description": "Centralized logging service",
        "type": "logservice",
        "title": "Logging service",
        "version": "v1"
    },
```

```
    {
        "singleton": true,
        "servers": [
            "http://localhost:9090/api/gateway/v1"
        ],
        "description": "REST API gateway",
        "type": "gateway",
        "title": "API Gateway",
        "version": "v1"
    }
]
```

Appendix VI. API Gateway API Specification

```
{
    "openapi": "3.0.3",
    "info": {
        "title": "API Gateway",
        "description": "REST API gateway",
        "version": "v1",
        "x-type": "gateway",
        "x-refresh-interval-milliseconds": 1000,
        "x-singleton": true
    },
    "servers": [
        {
            "url": "http://localhost:9090/api/gateway/v1"
        }
    ],
    "paths": {
        "/endpoints/{endpointID}/version": {
            "description": "API version for this endpoint",
            "get": {
                "operationId": "getVersion",
                "description": "Get the value of version",
                "parameters": [
                    {
                        "name": "endpointID",
                        "in": "path",
                        "description": "An endpoint ID",
                        "schema": {
                            "$ref": "#/components/schemas/StdUUID"
                        },
                        "required": true,
                        "deprecated": false
                    }
                ],
                "responses": {
                    "200": {
                        "description": "A String",
                        "content": {
                            "application/json": {
                                "schema": {
                                    "$ref": "#/components/schemas/StdString"
                                }
                            }
                        }
                    },
                    "default": {
                        "description": "Unexpected error"
                    }
                }
            },
            "x-group": "",
            "x-group-rank": 0
```

```
        },
        "/endpoints/{endpointID}/port": {
            "description": "Port number for this endpoint",
            "get": {
                "operationId": "getPort",
                "description": "Get the value of port",
                "parameters": [
                    {
                        "name": "endpointID",
                        "in": "path",
                        "description": "An endpoint ID",
                        "schema": {
                            "$ref": "#/components/schemas/StdUUID"
                        },
                        "required": true,
                        "deprecated": false
                    }
                ],
                "responses": {
                    "200": {
                        "description": "A Integer",
                        "content": {
                            "application/json": {
                                "schema": {
                                    "$ref": "#/components/schemas/StdInteger"
                                }
                            }
                        }
                    },
                    "default": {
                        "description": "Unexpected error"
                    }
                }
            },
            "x-group": "",
            "x-group-rank": 0
        },
        "/endpoints/{endpointID}/interval": {
            "description": "Refresh interval (milliseconds) for this endpoint",
            "get": {
                "operationId": "getRefreshIntervalMilliseconds",
                "description": "Get the value of interval",
                "parameters": [
                    {
                        "name": "endpointID",
                        "in": "path",
                        "description": "An endpoint ID",
                        "schema": {
                            "$ref": "#/components/schemas/StdUUID"
                        },
                        "required": true,
                        "deprecated": false
```

```
                        }
                    ],
                    "responses": {
                        "200": {
                            "description": "A Integer",
                            "content": {
                                "application/json": {
                                    "schema": {
                                        "$ref": "#/components/schemas/StdInteger"
                                    }
                                }
                            }
                        },
                        "default": {
                            "description": "Unexpected error"
                        }
                    }
                },
                "x-group": "",
                "x-group-rank": 0
            },
            "/endpoints/{endpointID}": {
                "description": "A specific element from a collection of DefaultProxyAPIEndpoint",
                "get": {
                    "operationId": "getEndpoint",
                    "description": "Get an instance of DefaultProxyAPIEndpoint",
                    "parameters": [
                        {
                            "name": "endpointID",
                            "in": "path",
                            "description": "An endpoint ID",
                            "schema": {
                                "$ref": "#/components/schemas/StdUUID"
                            },
                            "required": true,
                            "deprecated": false
                        },
                        {
                            "name": "endpointID",
                            "in": "path",
                            "description": "An endpoint ID",
                            "schema": {
                                "$ref": "#/components/schemas/StdUUID"
                            },
                            "required": true,
                            "deprecated": false
                        }
                    ],
                    "responses": {
                        "200": {
                            "description": "An object",
                            "content": {
```

```
                    "application/json": {
                        "schema": {
                            "$ref":
"#/components/schemas/DefaultProxyAPIEndpoint"
                        }
                    }
                }
            },
            "default": {
                "description": "Unexpected error"
            }
        }
    },
    "x-group": "",
    "x-group-rank": 0
},
"/endpoints": {
    "description": "Remote API endpoints",
    "get": {
        "operationId": "getEndpoints",
        "description": "Get a collection of DefaultProxyAPIEndpoint",
        "responses": {
            "200": {
                "description": "Get a collection of
DefaultProxyAPIEndpoint",
                "content": {
                    "application/json": {
                        "schema": {
                            "type": "array",
                            "items": {
                                "$ref":
"#/components/schemas/DefaultProxyAPIEndpoint"
                            }
                        }
                    }
                }
            },
            "default": {
                "description": "Unexpected error"
            }
        }
    },
    "post": {
        "operationId": "addEndpoint",
        "description": "Insert an instance of
DefaultProxyAPIEndpoint",
        "parameters": [
            {
                "name": "type",
                "in": "query",
                "description": "API type",
                "schema": {
                    "$ref": "#/components/schemas/StdString"
```

```
        },
        "required": true,
        "deprecated": false
    },
    {
        "name": "version",
        "in": "query",
        "description": "API version",
        "schema": {
            "$ref": "#/components/schemas/StdString"
        },
        "required": true,
        "deprecated": false
    },
    {
        "name": "uuid",
        "in": "query",
        "description": "Endpoint UUID",
        "schema": {
            "$ref": "#/components/schemas/StdString"
        },
        "required": true,
        "deprecated": false
    },
    {
        "name": "address",
        "in": "query",
        "description": "Host name or IP address",
        "schema": {
            "$ref": "#/components/schemas/StdString"
        },
        "required": true,
        "deprecated": false
    },
    {
        "name": "port",
        "in": "query",
        "description": "Server port number",
        "schema": {
            "$ref": "#/components/schemas/StdInteger"
        },
        "required": true,
        "deprecated": false
    },
    {
        "name": "milliseconds",
        "in": "query",
        "description": "Timeout interval milliseconds",
        "schema": {
            "$ref": "#/components/schemas/StdInteger"
        },
        "required": true,
        "deprecated": false
```

```
                }
            ],
            "responses": {
                "200": {
                    "content": {
                        "application/json": {
                            "schema": {
                                "$ref": "#/components/schemas/StdUUID"
                            }
                        }
                    }
                },
                "default": {
                    "description": "Unexpected error"
                }
            }
        },
        "x-group": "",
        "x-group-rank": 0
    },
    "/endpoints/{endpointID}/host": {
        "description": "Host/IP address for this endpoint",
        "get": {
            "operationId": "getHost",
            "description": "Get the value of host",
            "parameters": [
                {
                    "name": "endpointID",
                    "in": "path",
                    "description": "An endpoint ID",
                    "schema": {
                        "$ref": "#/components/schemas/StdUUID"
                    },
                    "required": true,
                    "deprecated": false
                }
            ],
            "responses": {
                "200": {
                    "description": "A String",
                    "content": {
                        "application/json": {
                            "schema": {
                                "$ref": "#/components/schemas/StdString"
                            }
                        }
                    }
                },
                "default": {
                    "description": "Unexpected error"
                }
            }
        },
```

```
            "x-group": "",
            "x-group-rank": 0
        },
        "/endpoints/{endpointID}/isSingleton": {
            "description": "Is the endpoint a singleton?",
            "get": {
                "operationId": "isSingleton",
                "description": "Get the value of isSingleton",
                "parameters": [
                    {
                        "name": "endpointID",
                        "in": "path",
                        "description": "An endpoint ID",
                        "schema": {
                            "$ref": "#/components/schemas/StdUUID"
                        },
                        "required": true,
                        "deprecated": false
                    }
                ],
                "responses": {
                    "200": {
                        "description": "A Boolean",
                        "content": {
                            "application/json": {
                                "schema": {
                                    "$ref": "#/components/schemas/StdString"
                                }
                            }
                        }
                    },
                    "default": {
                        "description": "Unexpected error"
                    }
                }
            },
            "x-group": "",
            "x-group-rank": 0
        },
        "/endpoints/{endpointID}/type": {
            "description": "API type of the this endpoint",
            "get": {
                "operationId": "getType",
                "description": "Get the value of type",
                "parameters": [
                    {
                        "name": "endpointID",
                        "in": "path",
                        "description": "An endpoint ID",
                        "schema": {
                            "$ref": "#/components/schemas/StdUUID"
                        },
                        "required": true,
```

```
                    "deprecated": false
                }
            ],
            "responses": {
                "200": {
                    "description": "A String",
                    "content": {
                        "application/json": {
                            "schema": {
                                "$ref": "#/components/schemas/StdString"
                            }
                        }
                    }
                },
                "default": {
                    "description": "Unexpected error"
                }
            }
        },
        "x-group": "",
        "x-group-rank": 0
    },
    "/endpoints/{endpointID}/ID": {
        "description": "Identity for this endpoint",
        "get": {
            "operationId": "getEndpointID",
            "description": "Get the value of ID",
            "parameters": [
                {
                    "name": "endpointID",
                    "in": "path",
                    "description": "An endpoint ID",
                    "schema": {
                        "$ref": "#/components/schemas/StdUUID"
                    },
                    "required": true,
                    "deprecated": false
                }
            ],
            "responses": {
                "200": {
                    "description": "A UUID",
                    "content": {
                        "application/json": {
                            "schema": {
                                "$ref": "#/components/schemas/StdUUID"
                            }
                        }
                    }
                },
                "default": {
                    "description": "Unexpected error"
                }
```

```
                    }
                },
                "x-group": "",
                "x-group-rank": 0
            }
        },
        "components": {
            "schemas": {
                "StdInteger": {
                    "type": "integer",
                    "format": "int32"
                },
                "StdString": {
                    "type": "string"
                },
                "StdNumber": {
                    "type": "number",
                    "format": "float"
                },
                "StdJSON": {
                    "type": "string"
                },
                "DefaultProxyAPIEndpoint": {
                    "properties": {
                        "port": {
                            "$ref": "#/components/schemas/StdInteger"
                        },
                        "host": {
                            "$ref": "#/components/schemas/StdString"
                        },
                        "isSingleton": {
                            "$ref": "#/components/schemas/StdBoolean"
                        },
                        "interval": {
                            "$ref": "#/components/schemas/StdInteger"
                        },
                        "ID": {
                            "$ref": "#/components/schemas/StdUUID"
                        },
                        "type": {
                            "$ref": "#/components/schemas/StdString"
                        },
                        "version": {
                            "$ref": "#/components/schemas/StdString"
                        }
                    }
                },
                "APIGateway": {
                    "properties": {
                        "endpoints": {
                            "type": "array",
                            "items": {
                                "$ref":
```

```
            "#/components/schemas/DefaultProxyAPIEndpoint"
                        }
                    }
                }
            },
            "StdUUID": {
                "type": "string"
            }
        }
    }
}
```

Appendix VII. API Gateway Example

```
{
    "endpoints": [
        {
            "port": 9092,
            "host": "localhost",
            "isSingleton": false,
            "interval": 1000,
            "ID": "89058956-2aff-453a-9eaa-45fac00b7bab",
            "type": "log",
            "version": "v1"
        },
        {
            "port": 9092,
            "host": "localhost",
            "isSingleton": false,
            "interval": 1000,
            "ID": "a9cd4ff8-19c5-4c71-b240-29543ba7c031",
            "type": "log",
            "version": "v1"
        },
        {
            "port": 9091,
            "host": "localhost",
            "isSingleton": true,
            "interval": 1000,
            "ID": "36296d12-3410-4328-9744-e6d96031a230",
            "type": "logservice",
            "version": "v1"
        },
        {
            "port": 9092,
            "host": "localhost",
            "isSingleton": false,
            "interval": 1000,
            "ID": "058c345e-047e-45ec-8a88-cfaff54ddd1d",
            "type": "log",
            "version": "v1"
        },
        {
            "port": 9092,
            "host": "localhost",
            "isSingleton": true,
            "interval": 1000,
            "ID": "215b0c49-0e2f-4913-87db-d4ca39543f07",
            "type": "orchestration",
            "version": "v1"
        },
        {
            "port": 9092,
            "host": "localhost",
```

```
        "isSingleton": false,
        "interval": 1000,
        "ID": "7d891ebe-b8a0-4989-a5dd-3bb2fe351658",
        "type": "log",
        "version": "v1"
    },
    {
        "port": 9092,
        "host": "localhost",
        "isSingleton": false,
        "interval": 1000,
        "ID": "f33d8e35-82cb-432d-8e01-285f8d7cf3ad",
        "type": "async-tcpip-channel",
        "version": "v1"
    },
    {
        "port": 9092,
        "host": "localhost",
        "isSingleton": false,
        "interval": 1000,
        "ID": "4a6aa570-1d3f-4bfb-95af-f3591348d6c4",
        "type": "session",
        "version": "v1"
    },
    {
        "port": 9092,
        "host": "localhost",
        "isSingleton": false,
        "interval": 1000,
        "ID": "83736b7a-f9d9-4aeb-9522-8f57bd07f11d",
        "type": "log",
        "version": "v1"
    },
    {
        "port": 9092,
        "host": "localhost",
        "isSingleton": false,
        "interval": 1000,
        "ID": "f29b29b7-e006-4f7b-80bb-ce23d89b54dd",
        "type": "async-tcpip-channel",
        "version": "v1"
    },
    {
        "port": 9092,
        "host": "localhost",
        "isSingleton": false,
        "interval": 1000,
        "ID": "a9b52294-2202-4388-af7a-122ea926055f",
        "type": "control",
        "version": "v1"
    },
    {
        "port": 9092,
```

```
        "host": "localhost",
        "isSingleton": false,
        "interval": 1000,
        "ID": "5297571f-a160-4b76-90a6-0aa06d45f19a",
        "type": "config",
        "version": "v1"
    },
    {
        "port": 9092,
        "host": "localhost",
        "isSingleton": false,
        "interval": 1000,
        "ID": "180a752e-0bac-449f-ace3-930eb4bd9363",
        "type": "control-mesh-io",
        "version": "v1"
    },
    {
        "port": 9092,
        "host": "localhost",
        "isSingleton": false,
        "interval": 1000,
        "ID": "e9099276-a167-4f2b-bfe5-f4bfd40a16d4",
        "type": "async-tcpip-channel",
        "version": "v1"
    },
    {
        "port": 9092,
        "host": "localhost",
        "isSingleton": false,
        "interval": 1000,
        "ID": "2ab21495-4809-4e82-ae31-d4b121083e10",
        "type": "log",
        "version": "v1"
    },
    {
        "port": 9092,
        "host": "localhost",
        "isSingleton": false,
        "interval": 1000,
        "ID": "e96a4655-baf4-4696-ae77-d7a77f9aa5ea",
        "type": "log",
        "version": "v1"
    },
    {
        "port": 9092,
        "host": "localhost",
        "isSingleton": false,
        "interval": 1000,
        "ID": "e2585f36-d29e-4e09-a914-010f7655cdc4",
        "type": "log",
        "version": "v1"
    },
    {
```

```
            "port": 9092,
            "host": "localhost",
            "isSingleton": false,
            "interval": 1000,
            "ID": "ec16234e-f14a-4f40-8c40-e13ea3773471",
            "type": "sql",
            "version": "v1"
        },
        {
            "port": 9092,
            "host": "localhost",
            "isSingleton": false,
            "interval": 1000,
            "ID": "9fffd987-4915-49be-8947-e77527507900",
            "type": "log",
            "version": "v1"
        },
        {
            "port": 9092,
            "host": "localhost",
            "isSingleton": false,
            "interval": 1000,
            "ID": "cd5b5d49-6d20-4bc1-821c-80bbf733a013",
            "type": "log",
            "version": "v1"
        }
    ]
}
```

What is claimed is:

1. A method of routing client provided application programming interface (API) requests via an API gateway, the method comprising:
   receiving, by the API gateway, an API request for an API from a client for a resource from one or more endpoints of a plurality of endpoints, wherein each of the plurality of endpoints each comprise an instance of the API, is remote from the API gateway, is registered with the API gateway using a unique identifier, and is represented by a proxy in the API gateway, the API request comprising a uniform resource identifier ("URI");
   determining whether the URI provided by the client comprises an expression provided by the client, wherein the expression comprises one or more predicates, or a wild-card, or whether the URI comprises a Universally Unique ID ("UUID") specifying a single unique endpoint;
   when the URI comprises the expression, selecting multiple of the plurality of endpoints based on the expression and routing, by the API gateway, the API request to the selected endpoints, each selected endpoint having the same particular API type and API version;
   receiving, by the API gateway, a plurality of responses to the request from a plurality of the selected endpoints;
   aggregating, by the API gateway, the plurality of responses into an array of responses; and
   when the URI comprises the UUID, routing, by the API gateway, the API request to the single unique endpoint.

2. The method of claim 1,
   wherein the array of responses comprises a JavaScript Object Notation (JSON) array.

3. The method of claim 1, wherein multiple instances of the API are located in a single business process.

4. The method of claim 1, further comprising:
   receiving a REST POST message comprising a POST wildcard expression, the POST message comprising an operation;
   resolving the POST wildcard expression to identify a plurality of POST API endpoints; and
   performing the operation at each of the plurality of POST API endpoints.

5. The method of claim 1, wherein the resource is an API document, wherein the API document defines return values of GET operations as arrays.

6. The method of claim 1, wherein the resource is an API document representing the API as defined by a corresponding endpoint.

7. The method of claim 1, wherein each endpoint comprises a software component that provides a business application function.

8. A non-transitory computer-readable medium storing instructions that, when executed by one or more processors, cause the processors to route client provided application programming interface (API) requests via an API gateway, the routing comprising:
   receiving, by the API gateway, an API request for an API from a client for a resource from one or more endpoints of a plurality of endpoints, wherein each of the plurality of endpoints each comprise an instance of the API, is remote from the API gateway, is registered with the API gateway using a unique identifier, and is represented by a proxy in the API gateway, the API request comprising a uniform resource identifier ("URI");
   determining whether the URI provided by the client comprises an expression provided by the client, wherein the expression comprises one or more predicates, or a wild-card, or whether the URI comprises a Universally Unique ID ("UUID") specifying a single unique endpoint;
   when the URI comprises the expression, selecting multiple of the plurality of endpoints based on the expression and routing, by the API gateway, the API request to the selected endpoints, each selected endpoint having the same particular API type and API version;
   receiving, by the API gateway, a plurality of responses to the request from a plurality of the selected endpoints;
   aggregating, by the API gateway, the plurality of responses into an array of responses; and
   when the URI comprises the UUID, routing, by the API gateway, the API request to the single unique endpoint.

9. The computer-readable medium of claim 8, the routing further comprising:
   wherein the array of responses comprises a JavaScript Object Notation (JSON) array.

10. The computer-readable medium of claim 8, wherein multiple instances of the API are located in a single business process.

11. The computer-readable medium of claim 8, further comprising:
    receiving a REST POST message comprising a POST wildcard expression, the POST message comprising an operation;
    resolving the POST wildcard expression to identify a plurality of POST API endpoints; and
    performing the operation at each of the plurality of POST API endpoints.

12. The computer-readable medium of claim 8, wherein the resource is an API document, wherein the API document defines return values of GET operations as arrays.

13. The computer-readable medium of claim 8, wherein the resource is an API document representing the API as defined by a corresponding endpoint.

14. The computer-readable medium of claim 8, wherein each endpoint comprises a software component that provides a business application function.

15. An application programming interface (API) gateway comprising:
    one or more processors that execute instructions to perform client provided routing application programming interface (API) requests via an API gateway, the routing comprising:
    receiving, by the API gateway, an API request for an API from a client for a resource from one or more endpoints of a plurality of endpoints, wherein each of the plurality of endpoints each comprise an instance of the API, is remote from the API gateway, is registered with the API gateway using a unique identifier, and is represented by a proxy in the API gateway, the API request comprising a uniform resource identifier ("URI");
    determining whether the URI provided by the client comprises an expression provided by the client, wherein the expression comprises one or more predicates, or a wild-card, or whether the URI comprises a Universally Unique ID ("UUID") specifying a single unique endpoint;
    when the URI comprises the expression, selecting multiple of the plurality of endpoints based on the expression and routing, by the API gateway, the API request to the selected endpoints, each selected endpoint having the same particular API type and API version;

receiving, by the API gateway, a plurality of responses to the request from a plurality of the selected endpoints;

aggregating, by the API gateway, the plurality of responses into an array of responses; and when the URI comprises the UUID, routing, by the API gateway, the API request to the single unique endpoint.

16. The gateway of claim 15 wherein the array of responses comprises a JavaScript Object Notation (JSON) array.

17. The gateway of claim 15, further comprising:

receiving a REST POST message comprising a POST wildcard expression, the POST message comprising an operation;

resolving the POST wildcard expression to identify a plurality of POST API endpoints; and performing the operation at each of the plurality of POST API endpoints.

18. The gateway of claim 15, wherein the resource is an API document, wherein the API document defines return values of GET operations as arrays.

19. The gateway of claim 15, wherein the resource is an API document representing the API as defined by a corresponding endpoint.

20. The gateway of claim 15, wherein each endpoint comprises a software component that provides a business application function.

\* \* \* \* \*